US012735536B2

(12) United States Patent
Yamazaki et al.

(10) Patent No.: US 12,735,536 B2
(45) **Date of Patent: *Sep. 15, 2026**

(54) CURABLE SILICONE COMPOSITION, CURED PRODUCT OF SAME, AND LAMINATE

(71) Applicant: DOW TORAY CO., LTD., Tokyo (JP)

(72) Inventors: Ryosuke Yamazaki, Ichihara (JP); Shinichi Yamamoto, Ichihara (JP); Kouichi Ozaki, Ichihara (JP); Toru Imaizumi, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 376 days.

This patent is subject to a terminal disclaimer.

(21) Appl. No.: 18/268,222

(22) PCT Filed: Dec. 14, 2021

(86) PCT No.: PCT/JP2021/046093
§ 371 (c)(1),
(2) Date: Jun. 17, 2023

(87) PCT Pub. No.: WO2022/138336
PCT Pub. Date: Jun. 30, 2022

(65) Prior Publication Data

US 2024/0052106 A1 Feb. 15, 2024

(30) Foreign Application Priority Data

Dec. 25, 2020 (JP) ................................ 2020-216206

(51) Int. Cl.
*C08G 77/12* (2006.01)
*C08G 77/08* (2006.01)
(Continued)

(52) U.S. Cl.
CPC ............ *C08G 77/12* (2013.01); *C08G 77/08* (2013.01); *C08G 77/20* (2013.01); *C08J 3/28* (2013.01);
(Continued)

(58) Field of Classification Search
CPC ........ C09J 7/35; C09J 183/04; C09J 2483/00; C09J 2203/326; C09J 2301/408;
(Continued)

(56) References Cited

U.S. PATENT DOCUMENTS 5,100,976 A 3/1992 Hamada et al.
5,145,886 A 9/1992 Oxman et al.
(Continued)

FOREIGN PATENT DOCUMENTS

AU 618818 B2 1/1992
CN 101151328 A 3/2008
(Continued)

OTHER PUBLICATIONS

Machine translation of JPWO 2020/138055, retrieved Nov. 17, 2025.*
(Continued)

*Primary Examiner* — Michael B Nelson
(74) *Attorney, Agent, or Firm* — Warner Norcross + Judd LLP

(57) ABSTRACT

Provided is a hot-melt curable silicone composition with excellent hot dispensing properties and storage stability, which can be cured by triggering an external energy stimulus, and which provides excellent adhesive and mechanical properties to the cured product, and applications thereof. A curable silicone composition, including in a specific mass % range, comprises: (A) a non-hot-melt solid organopolysiloxane resin mixture; (B) a linear organopolysiloxane that is liquid at 25° C. having the same curing reactive functional
(Continued)

group; (C) an organohydrogen polysiloxane; and (D) a hydrosilylation reaction catalyst that is inert at room temperature but is activated by an external energy stimulus. The whole composition has hot-melt properties, and the melt viscosity (flow tester measurement) at 100° C. is 50 Pa·s or less. A cured product thereof, and use in semiconductor applications and the like, is also provided. The composition is particularly suitable for use as an adhesive or sealing agent in hot dispensing applications.

16 Claims, 1 Drawing Sheet

(51) Int. Cl.
*C08G 77/20* (2006.01)
*C08J 3/28* (2006.01)
*C08L 83/04* (2006.01)
*C09J 183/04* (2006.01)

(52) U.S. Cl.
CPC ............. *C08L 83/04* (2013.01); *C09J 183/04* (2013.01); *C08G 2170/00* (2013.01); *C08G 2190/00* (2013.01); *C08L 2203/20* (2013.01); *C08L 2205/025* (2013.01); *C08L 2205/035* (2013.01); *C08L 2312/06* (2013.01); *C08L 2312/08* (2013.01)

(58) Field of Classification Search
CPC ........ C09J 7/10; B29C 45/0001; B29C 55/02; C08L 83/04; C08L 2205/025; B29K 2083/00; H10H 20/851; H10H 20/854; C08K 2003/2227; C08K 3/013; C08K 5/14; C08K 5/54; C08G 77/12; C08G 77/20; C08G 77/70; C09D 183/04; H01L 23/296; B32B 7/06; B32B 7/12
See application file for complete search history.

(56) References Cited

U.S. PATENT DOCUMENTS 5,169,727 A 12/1992 Boardman
5,357,007 A 10/1994 Wengrovius et al.
5,392,592 A 2/1995 Bozich et al.
5,668,225 A * 9/1997 Okazaki ............... C09K 3/1018 524/588
5,977,243 A 11/1999 Barthel et al.
6,177,506 B1 1/2001 Takahashi et al.
6,376,569 B1 4/2002 Oxman et al.
6,379,792 B1 4/2002 Isshiki et al.
6,433,055 B1 8/2002 Kleyer et al.
8,124,689 B2 2/2012 Loubert et al.
2002/0132891 A1 9/2002 Azechi et al.
2004/0265599 A1 12/2004 Ushio et al.
2006/0057779 A1 3/2006 Sutoh et al.
2006/0094834 A1 5/2006 Aoki et al.
2006/0270788 A1 11/2006 Ozai et al.
2008/0319144 A1 12/2008 Morita et al.
2009/0042043 A1 2/2009 Joseph et al.
2009/0075009 A1 3/2009 Fujisawa et al.
2009/0171013 A1 7/2009 Taguchi et al.
2009/0281222 A1 11/2009 Nishiumi et al.
2011/0104506 A1 5/2011 Behl et al.
2011/0236666 A1 9/2011 Hall et al.
2012/0139131 A1 6/2012 Sugo et al.
2013/0183776 A1 7/2013 Kashiwagi et al.
2013/0200554 A1 8/2013 Mueller
2013/0274398 A1 10/2013 Shiobara et al.
2014/0296468 A1 10/2014 Kownacka et al.
2014/0377570 A1 12/2014 Hirai et al.
2015/0115311 A1 4/2015 Yoshida et al.
2015/0124338 A1 5/2015 Mayumi et al.
2015/0183960 A1 7/2015 Yamazaki et al.
2015/0315427 A1 11/2015 Yoshida et al.
2015/0376482 A1 12/2015 Bekemeier et al.
2016/0230005 A1 8/2016 Mayumi et al.
2016/0311980 A1 10/2016 Knoer
2017/0057980 A1 3/2017 Boyer et al.
2017/0058103 A1 3/2017 Fujisawa et al.
2017/0092822 A1 3/2017 Amako et al.
2017/0166701 A1* 6/2017 Jo .......................... C08G 77/38
2017/0283613 A1 10/2017 Mochizuki
2017/0355804 A1 12/2017 Fujisawa et al.
2018/0105692 A1* 4/2018 Imaizumi ................. C08J 3/203
2018/0208816 A1 7/2018 Yamazaki et al.
2018/0305547 A1 10/2018 Dogen et al.
2019/0169398 A1 6/2019 Yamazaki
2019/0169435 A1 6/2019 Yamazaki
2019/0177488 A1 6/2019 Yamazaki
2019/0276684 A1 9/2019 Yamazaki et al.
2019/0367744 A1 12/2019 Chevalier et al.
2020/0216671 A1 7/2020 Matsuzaki et al.
2020/0224069 A1 7/2020 Itoh et al.
2020/0354615 A1 11/2020 Itoh et al.
2020/0392335 A1 12/2020 Yamazaki
2021/0162704 A1 6/2021 Sreeram et al.
2021/0179783 A1 6/2021 Yoshitake
2021/0179849 A1 6/2021 Yoshitake
2021/0189129 A1 6/2021 Yamazaki et al.
2021/0198489 A1 7/2021 Yoshitake
2021/0269691 A1 9/2021 Itoh et al.
2021/0284888 A1 9/2021 Itoh et al.
2021/0292607 A1 9/2021 Itoh et al.
2022/0002493 A1 1/2022 Sugie et al.
2022/0048230 A1 2/2022 Imaizumi et al.
2022/0064447 A1 3/2022 Yamazaki
2022/0064491 A1 3/2022 Yamazaki
2022/0089872 A1 3/2022 Fukui et al.
2022/0169894 A1* 6/2022 Yamazaki .............. C08G 77/70
2022/0186099 A1 6/2022 Yamazaki et al.
2022/0195269 A1 6/2022 Yamazaki
2022/0340756 A1 10/2022 Nishijima et al.
2022/0403114 A1 12/2022 Sugie et al.
2023/0044439 A1 2/2023 Yamamoto et al.
2023/0137947 A1 5/2023 Yamazaki et al.
2023/0151215 A1 5/2023 Yamazaki et al.
2024/0002605 A1 1/2024 Tanaka et al.
2024/0052106 A1 2/2024 Yamazaki et al.
2024/0052220 A1 2/2024 Yamamoto et al.

FOREIGN PATENT DOCUMENTS

CN 103849149 A 6/2014
CN 104870585 A 8/2015
CN 106459419 A 2/2017
CN 106715593 A 5/2017
CN 107429062 A 12/2017
CN 108026373 A 5/2018
CN 109844029 A 6/2019
EP 1002834 A1 5/2000
EP 3954739 A1 2/2022
EP 4083140 A1 11/2022
EP 4130157 A1 2/2023
EP 4269503 A1 11/2023
JP H0275681 A 3/1990
JP H0625602 A 2/1994
JP H10195085 A 7/1998
JP H11158379 A 6/1999
JP H11279182 A 10/1999
JP H11335572 A 12/1999
JP 2000063681 A 2/2000
JP 2000198929 A 7/2000
JP 2001019933 A 1/2001
JP 2002155261 A 5/2002
JP 2003176462 A 6/2003
JP 2003226812 A 8/2003
JP 2004043814 A 2/2004
JP 2004307691 A 11/2004
JP 2004315571 A 11/2004
JP 2005007331 A 1/2005
JP 2006188593 A 7/2006

(56) References Cited

FOREIGN PATENT DOCUMENTS

| | | | |
|---|---|---|---|
| JP | 2006274007 | A | 10/2006 |
| JP | 2007119768 | A | 5/2007 |
| JP | 2007231039 | A | 9/2007 |
| JP | 2009503133 | A | 1/2009 |
| JP | 2009132797 | A | 6/2009 |
| JP | 2009155415 | A | 7/2009 |
| JP | 2010047646 | A | 3/2010 |
| JP | 2010509088 | A | 3/2010 |
| JP | 2011525444 | A | 9/2011 |
| JP | 2012017427 | A | 1/2012 |
| JP | 2013076050 | A | 4/2013 |
| JP | 2013523482 | A | 6/2013 |
| JP | 2013147546 | A | 8/2013 |
| JP | 2013221075 | A | 10/2013 |
| JP | 2013221082 | A | 10/2013 |
| JP | 2013222761 | A | 10/2013 |
| JP | 2013232580 | A | 11/2013 |
| JP | 5385247 | B2 | 1/2014 |
| JP | 2014009322 | A | 1/2014 |
| JP | 2014221915 | A | 11/2014 |
| JP | 2015010132 | A | 1/2015 |
| JP | 2015110752 | A | 6/2015 |
| JP | 2015214637 | A | 12/2015 |
| JP | 2016124967 | A | 7/2016 |
| JP | 2017-512224 | A | 5/2017 |
| JP | 2017101137 | A | 6/2017 |
| JP | 2017520918 | A | 7/2017 |
| JP | 2017226724 | A | 12/2017 |
| JP | 2018519369 | A | 7/2018 |
| JP | 2018177993 | A | 11/2018 |
| JP | 2019167832 | A | 10/2019 |
| JP | 2019167833 | A | 10/2019 |
| JP | 2021107149 | A | 7/2021 |
| JP | 2021108319 | A | 7/2021 |
| TW | 201439219 | A | 10/2014 |
| WO | 2006104236 | A1 | 10/2006 |
| WO | 2008056810 | A1 | 5/2008 |
| WO | 2013051600 | A1 | 4/2013 |
| WO | 2014002918 | A1 | 1/2014 |
| WO | 2014136805 | A1 | 9/2014 |
| WO | 2015056483 | A1 | 4/2015 |
| WO | 2015126780 | A1 | 8/2015 |
| WO | 2015155949 | A1 | 10/2015 |
| WO | 2016038836 | A1 | 3/2016 |
| WO | 2016103654 | A1 | 6/2016 |
| WO | 20160136243 | A1 | 9/2016 |
| WO | 2017068762 | A1 | 4/2017 |
| WO | 2018028792 | A1 | 2/2018 |
| WO | 2018030286 | A1 | 2/2018 |
| WO | 2018030287 | A1 | 2/2018 |
| WO | 2018030288 | A1 | 2/2018 |
| WO | 2018084012 | A1 | 5/2018 |
| WO | 2018186161 | A1 | 10/2018 |
| WO | 2018235491 | A1 | 12/2018 |
| WO | 2018235492 | A1 | 12/2018 |
| WO | 2019059351 | A1 | 3/2019 |
| WO | 2019078140 | A1 | 4/2019 |
| WO | 2019088067 | A1 | 5/2019 |
| WO | 2019208756 | A1 | 10/2019 |
| WO | 2020090797 | A | 5/2020 |
| WO | 2020090797 | A1 | 5/2020 |
| WO | 2020138055 | A1 | 7/2020 |
| WO | 2020138409 | A1 | 7/2020 |
| WO | 2020138410 | A1 | 7/2020 |
| WO | WO 2020/138055 | * | 7/2020 |
| WO | 2020166692 | A1 | 8/2020 |
| WO | 2020203304 | A1 | 10/2020 |
| WO | 2020203307 | A1 | 10/2020 |
| WO | WO 2020/203304 | * | 10/2020 |
| WO | 2021132710 | A1 | 7/2021 |
| WO | 2021200643 | A1 | 10/2021 |
| WO | 2022004463 | A1 | 1/2022 |
| WO | 2022138336 | A1 | 6/2022 |

OTHER PUBLICATIONS

Machine assisted English translation of JPH10195085A obtained from https://patents.google.com/patent on Jan. 22, 2025, 10 pages.
English translation of International Search Report for PCT/JP2019/042320 dated Mar. 24, 2020, 2 pages.
Machine assisted English translation of JP2010047676A obtained from https://patents.google.com/patent on Jul. 21, 2021, 9 pages.
Machine assisted English translation of JP2015214637A obtained from https://patents.google.com/patent on Jul. 21, 2021, 11 pages.
Machine assisted English translation of JP2017101137A obtained from https://patents.google.com/patent on Jul. 21, 2021, 11 pages.
Machine assisted English translation of CN103849149A obtained from https://worldwide.espacenet.com/patent on Jan. 22, 2024, 11 pages.
Machine assisted English translation of JPH11158379A obtained from https://worldwide.espacenet.com/patent on Nov. 9, 2023, 11 pages.
Machine assisted English translation of CN106715593A obtained from https://patents.google.com/patent on Mar. 14, 2023, 26 pages.
Machine assisted English translation of JP2005007331A obtained from https://patents.google.com/patent on Mar. 14, 2023, 15 pages.
Machine assisted English translation of JP2004315571A obtained from https://patents.google.com/patent on Mar. 14, 2023, 15 pages.
Machine assisted English translation of JP2015010132A obtained from https://patents.google.com/patent on Mar. 14, 2023, 22 pages.
Machine assisted English translation of JP2004307691A obtained from https://patents.google.com/patent on Mar. 14, 2023, 11 pages.
Machine assisted English translation of JP2013222761A obtained from https://patents.google.com/patent on Mar. 15, 2023, 20 pages.
Machine assisted English translation of JP2018177993A obtained from https://patents.google.com/patent on Mar. 15, 2023, 36 pages.
International Search Report for PCT/JP2019/051394 dated Mar. 17, 2020, 2 pages.
Machine assisted English translation of WO2018235492A1 obtained from https://patents.google.com/patent on Oct. 4, 2021, 20 pages.
Machine assisted English translation of JP2016124967A obtained from https://patents.google.com/patent on Oct. 4, 2021, 18 pages.
Machine assisted English translation of WO2016038836A1 obtained from https://patents.google.com/patent on Oct. 4, 2021, 18 pages.
Machine assisted English translation of WO2013051600A1 obtained from https://patents.google.com/patent on Oct. 4, 2021, 25 pages.
Machine assisted English translation of JP2007231039A obtained from https://patents.google.com/patent on Oct. 5, 2021, 7 pages.
International Search Report for PCT/JP2019/051393 dated Mar. 17, 2020, 3 pages.
International Search Report for PCT/JP2019/051392 dated Mar. 17, 2020, 2 pages.
International Search Report for PCT/JP2019/051391 dated Mar. 13, 2020, 3 pages.
International Search Report for PCT/JP2020/012028 dated Jun. 9, 2020, 3 pages.
Machine assisted English translation of JP2013221082A obtained from https://patents.google.com/patent on Oct. 27, 2021, 14 pages.
Machine assisted English translation of WO2020138410A1 obtained from https://patents.google.com/patent on Oct. 27, 2021, 19 pages.
Machine assisted English translation of WO2020138409A1 obtained from https://patents.google.com/patent on Oct. 27, 2021, 24 pages.
Machine assisted English translation of JP11335572A obtained from https://patents.google.com/patent on Oct. 27, 2021, 7 pages.
Machine assisted English translation of JPH11279182A obtained from https://patents.google.com/patent on Oct. 27, 2021, 8 pages.
Machine assisted English translation of JP2003176462A obtained from https://patents.google.com/patent on Oct. 27, 2021, 11 pages.
Machine assisted English translation of JP2009132797A obtained from https://patents.google.com/patent on Oct. 27, 2021, 9 pages.
Machine assisted English translation of JP2012017427A obtained from https://patents.google.com/patent on Oct. 27, 2021, 13 pages.
Machine assisted English translation of JP2000063681A obtained from https://patents.google.com/patent on Oct. 28, 2021, 8 pages.
International Search Report for PCT/JP2020/012027 dated Jun. 9, 2020, 3 pages.

(56) References Cited

OTHER PUBLICATIONS

International Search Report for PCT/JP2020/012030 dated Jun. 9, 2020, 2 pages.
International Search Report for PCT/JP2020/012029 dated Jun. 9, 2020, 3 pages.
International Search Report (with English translation) for PCT/JP2020/049074 dated Mar. 23, 2021, 7 pages.
Machine assisted English translation of JPH0625602 obtained from https://patents.google.com/patent on Nov. 11, 2022, 6 pages.
Machine assisted English translation of JP2019167832 obtained from https://patents.google.com/patent on Nov. 11, 2022, 11 pages.
Machine assisted English translation of JP2019167833 obtained from https://patents.google.com/patent on Nov. 11, 2022, 9 pages.
International Search Report (with English translation) for PCT/JP2021/012840 dated Jun. 15, 2021, 6 pages.
English translation of International Search Report for PCT/JP2022/046146 dated Jan. 31, 2023, 2 pages.
Machine assisted English translation of JP2021108319A obtained from https://worldwide.espacenet.com/patent on Mar. 12, 2024, 73 pages.
Machine assisted English translation of WO2020138055A1 obtained from https://worldwide.espacenet.com/patent on Apr. 7, 2024, 43 pages.
Machine assisted English translation of JP2014221915A obtained from <https://patents.google.com/patent> on Nov. 20, 2024, 17 pages.
Machine assisted English translation of WO2019208756A1 obtained from https://worldwide.espacenet.com/patent on Dec. 21, 2023, 32 pages.
English translation of International Search Report for PCT/JP2021/046092 dated Feb. 8, 2022, 2 pages.
English translation of International Search Report for PCT/JP2021/046093 dated Mar. 15, 2022, 2 pages.
Dowsiltm EA-4600 Silicone Adhesive Application Guide for PCT Device Assemblies (Dow Toray Co., Ltd. publication, Form No. 1-3497-42-1120 S2D, 2020).
Machine assisted English translation of JP2017226724A obtained from https://patents.google.com/patent on Aug. 14, 2024, 14 pages.
Machine assisted English translation of JP2003226812A obtained from https://patents.google.com/patent on Aug. 14, 2024, 11 pages.
Machine assisted English translation of JP2010047646A obtained from https://patents.google.com/patent on Aug. 14, 2024, 9 pages.

* cited by examiner

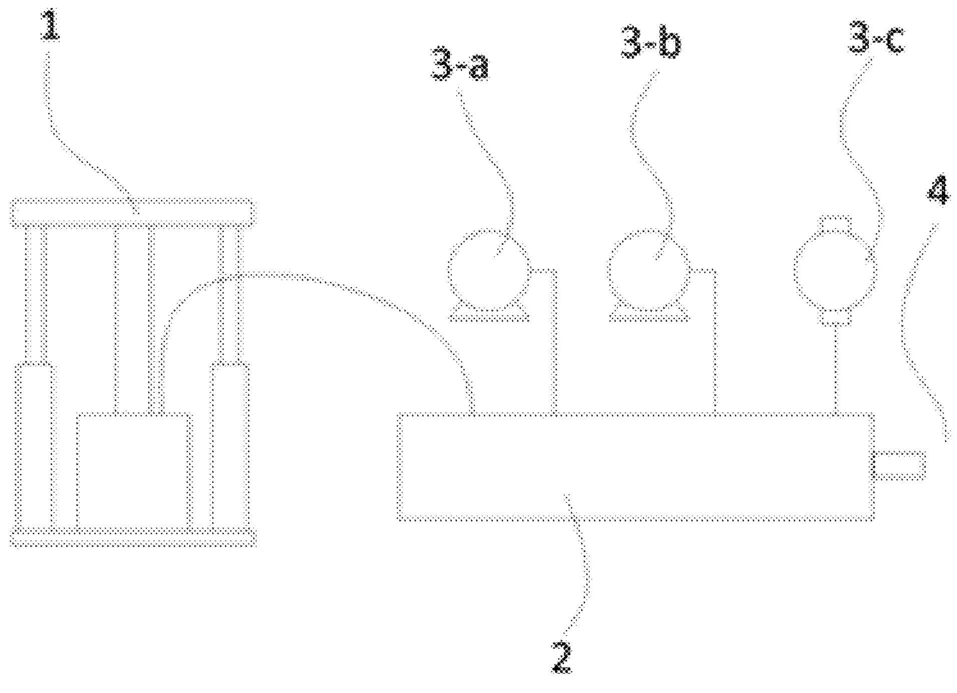
1
3-a
3-b
3-c
4
2

CURABLE SILICONE COMPOSITION, CURED PRODUCT OF SAME, AND LAMINATE

CROSS-REFERENCE TO RELATED APPLICATIONS

This application is the U.S. National Stage of PCT/JP2021/046093 filed on 14 Dec. 2021, which claims priority to Japanese Patent Application No. 2020-216206 filed on 25 Dec. 2020, the content of which is incorporated herein by reference.

TECHNICAL FIELD

The present invention relates to a hot-melt curable silicone composition that is solid at room temperature but can be dispensed from a dispenser, or the like, when heated to, for example, 50° C. or higher, but the curing reactivity is suppressed at the dispensing temperature. The composition has excellent curability triggered by external energy stimuli, such as high energy beam irradiation or exposure to temperatures of 130° C. or higher, and provides a cured product that is relatively high in hardness and has low tack. Furthermore, the present invention relates to a cured product thereof, and a laminate body including the composition or cured product. Furthermore, the present invention relates to: an application of the composition or cured product (particularly including a semiconductor device or the like having a member for a semiconductor device, member for an optical semiconductor device, or other member for a semiconductor and the cured product); and a method of manufacturing a laminate body using the composition.

BACKGROUND ART

Curable silicone compositions can be cured to form cured products having excellent heat resistance, cold resistance, electrical insulation, weather resistance, water repellency, and transparency, and are utilized in a wide range of industrial fields. In general, a cured product of such a curable silicone composition is less prone to discoloration compared with other organic materials, and has reduced deterioration of physical properties over time, and therefore is also suitable as a sealing agent or adhesive for optical materials and semiconductor devices.

In recent years, hot-melt curable silicone compositions have become increasingly popular from the viewpoint of ease of handling and cost reduction. For example, hot-melt curable silicone compositions in tablet and sheet forms have been proposed in Patent documents 1 to 3. Although these curable silicone compositions have excellent meltability and curability/moldability as sealing agents, recent production processes for semiconductors and the like may require liquid dispensing/application by dispensers, for the adhesives/sealants for semiconductors and electronic components. Therefore, there is a problem that it is not possible to flexibly change the application form of curable silicone compositions to suit the adhesive or sealing/sealing form in forms such as tablets, or the like.

On the other hand, Non-Patent Document 1 proposes the use of a hot-melt curable silicone composition product (DOWSIL™ EA-4600 silicone adhesive) dispensed by a heated dispenser. However, the curable silicone composition products are room temperature curable and require a curing time of approximately 7 days, and thus there is a problem that they cannot sufficiently adapt to short curing processes during production of semiconductors and the like and for the demand for a cured product with high hardness and low tack. Furthermore, hot-melt curable silicone compositions require constant heating during heating and melting, they may not cure at the desired timing because the curing reaction begins to progress upon heating, which causes a problem with controllability of the reaction.

PRIOR ART DOCUMENTS

Patent Documents

[Patent Document 1]: International Patent Publication WO 2016/136243

[Patent Document 2]: Japanese Unexamined Patent Application 2014-009322

[Patent Document 3]: Japanese PCT Patent Application 2017-512224

[Non-Patent Document 1]: DOWSIL™ EA-4600 Silicone Adhesive Application Guide for PCB Device Assemblies (Dow Toray Industries, Inc. Publication, Form No. 11-3497-42-1120 S2D, 2020).

SUMMARY OF THE INVENTION

Problem to be Solved by the Invention

An object of the present invention is to solve the above problems, and to develop a hot-melt curable silicone composition that is solid at room temperature but can be dispensed from a dispenser or the like when heated, and that has excellent controllability of reaction by suppressing the curing reactivity between room temperature and the dispensing temperature. The composition can be cured at a desired timing and at a high speed. The cured product has sufficient adhesive and mechanical properties for practical use and shows relatively high hardness and low tack. Another object is to provide a cured product and application thereof.

Means for Solving the Problem

After careful investigation, the present inventors discovered that the aforementioned problems can be resolved by a curable silicone composition containing: an organopolysiloxane resin having a curing reactive functional group containing a carbon-carbon double bond, an organopolysiloxane resin that is solid at 25° C., containing an organopolysiloxane resin without the same curing reactive functional group, linear organopolysiloxane and organohydrogen polysiloxane in liquid form at 25° C. having the same curing reactive functional group; and a hydrosilylation reaction catalyst that is inert at room temperature but that demonstrates activity in the composition due to an external energy stimulus (preferably a catalyst selected from photoactive hydrosilylation reaction catalysts and thermoplastic resin microparticles containing a hydrosilylation reaction catalyst) within a specific parts range; wherein the composition as a whole has hot-melt properties, and the melt viscosity (measured with a flow tester: outlet nozzle diameter 1 mm, pressure 2.5 MPa) at 100° C. is 50 Pa-s or less; as well as by a cured product thereof, and use thereof in semiconductor applications and the like, and thus the present invention was achieved. The composition may also contain a substantially non-volatile hydrosilylation reaction curing retarder. In addition, in order to achieve an organopolysiloxane resin with the composition above that suppresses surface tack of a cured product thereof and provides a relatively hard cured product, the mass loss ratio of the organopolysiloxane resin is more preferably 2.0 mass % or less after 1 hour of exposure at 200° C.

From the perspective of the technical effect of the present invention, the curable silicone composition is suitable to be used in a form filled in a dispensing cartridge, pail, or drum, and the cartridge, pail, or drum can be heated by a dispenser equipped with a heating part and dispensed onto a substrate to form a laminate body that is a semiconductor precursor or electronic component precursor.

Effects of the Invention

The present invention provides a hot-melt curable silicone composition, cured product thereof, and application thereof wherein by selectively combining a hydrosilylation reaction catalyst with a property of being activated by an external energy stimulus with a hot-melt curing silicone composition, the composition will be solid at room temperature, but can be dispensed stably by heating, for example, at 80° C. or higher, by a dispenser or the like, while on the other hand, since the curing reactivity is suppressed at the dispensing temperature, the reaction is highly controllable and can be triggered by irradiation with a high energy beam such as UV rays or the like and/or exposure to a temperature higher than the dispensing temperature (for example, 130° C. or higher) to cure at a high speed. The cured product has sufficient adhesive and mechanical properties for practical use, and exhibits relatively high hardness and low surface tack.

Herein, if the above-mentioned hydrosilylation reaction catalyst is a photoactive hydrosilylation reaction catalyst that is activated by irradiation with a high energy beam, the composition after dispensing can be cured at high speed even at low temperatures of 100° C. or lower by irradiation with a high energy beam. On the other hand, a composition to which black or white pigments have been added may absorb or reflect the high energy beam and fail to activate the reaction catalyst. In such cases, the resin can be dispensed stably at the dispensing temperature, and can be cured quickly by heating to a temperature above the melting temperature of the thermoplastic resin (suitably, 130° C. or higher) by using thermoplastic resin particles containing a hydrosilylation reaction catalyst as the catalyst. Needless to say, the type of hydrosilylation reaction catalyst and the energy stimulus used to activate the catalyst can be selected as appropriate based on the composition and the curing process of the composition, and a combination of both can be used.

In particular, the hot-melt curable silicone composition according to the present invention is suitable for use as a sealing agent/sealant to protect the substrate. Furthermore, the composition can also be used for adhesive applications between substrates (double-sided adhesive applications when two substrates are used) where a relatively hard adhesive layer is required. Furthermore, precision coating is also possible by connecting a heatable slot die to the outlet of the dispenser to dispense the product in a film or sheet form controlled to the desired thickness, and apply the product to the substrate. The curing reaction does not proceed during heating and melting, so the curable silicone composition of the present invention can be efficiently manufactured using only a simple mixing process, and can be provided in a desired form, particularly filled into a dispensing cartridge, pail, or drum. Furthermore, since the curable silicone composition of the present invention is applicable to a hot dispensing process, the composition can be used as a sealant/sealing agent by dispensing onto a substrate in a desired shape and curing by triggering an external energy stimulus (such as irradiation by high energy beam such as UV rays or the like, exposure to a temperature of 130° C. or higher, or the like). In addition, the composition can also be used as an adhesive layer between substrates by curing in a state of adhesion (including pressure bonding) with the adherend substrate, if necessary.

BRIEF DESCRIPTION OF THE DRAWINGS

FIG. 1 is a schematic diagram of a twin-screw extruder used in the Examples.

MODE FOR CARRYING OUT THE INVENTION

Embodiments of the present invention will be described below in detail. In the present specification, room temperature generally refers to a range of 15 to 30° C., particularly 18 to 25° C., and atmospheric pressure refers to the atmospheric pressure in the environment where the curable silicone composition of the present invention is handled in a laboratory, factory, or the like, normally around 1 atm (1013.25 hPa). Furthermore, with the present invention, unless otherwise stated, "having hot-melt properties" means that the entire composition has a high viscosity (including a raw rubber-like state in which plasticity can be measured) or is in a solid state to the extent that the shape can be retained at 25° C., but has a melt viscosity in the range described later at 100° C., and the material is softened and becomes flowable upon heating. Conversely, "not having hot-melt properties" means that the composition or component (solid organopolysiloxane resin or the like) does not exhibit heating and melting behavior independently at 200° C. or lower, and specifically means that the component does not have a softening point or melt viscosity at a temperature of 200° C. or lower.

Curable Silicone Composition

The curable silicone composition according to the present invention contains:

(A) 100 parts by mass of organopolysiloxane resin containing the following components (A1) and (A2) at a mass ratio of 20:80 to 90:10, where each individual component does not have hot-melt properties and is solid at 25° C., (A1) an organopolysiloxane resin having a curing reactive functional group with a carbon-carbon double bond included in a molecule, and containing a siloxane unit expressed by $RSiO_{3/2}$ (R represents a monovalent organic group, hydroxyl group or alkoxy group) or $SiO_{4/2}$ making up at least 20 mol % or more of all siloxane units, and (A2) an organopolysiloxane resin having a curing reactive functional group with a carbon-carbon double bond included in a molecule, and containing a siloxane unit expressed by $SiO_{4/2}$ making up at least 20 mol % or more of the total siloxane units;

(B) a linear organopolysiloxane in a liquid state at 25° C., having a curing reactive functional group containing at least two carbon-carbon double bonds in a molecule;

(C) an organohydrogen polysiloxane that includes, within a molecule, at least two silicon atom-bonded hydrogen atoms; and (D) a hydrosilylation reaction catalyst that is inert at room temperature but becomes activated in the composition upon external energy stimulus;

wherein the composition as a whole has hot-melt properties and the melt viscosity (measured with a flow tester: outlet nozzle diameter 1 mm, pressure 2.5 MPa) at 100° C. is 50 Pa-s or less.

The composition may contain (E) a hydrosilylation reaction curing retarder with a boiling point of 200° C. or higher under atmospheric pressure, and may contain other additives, so long as the technical effects of the present invention are not impaired.

Organopolysiloxane Resin (A1) Having a Curing Reactive Functional Group

Component (A1) is one of the main agents of the present composition, and has a curing reactive functional group containing a carbon-carbon double bond in a molecule, in which at least 20 mol % or more of all siloxane units are siloxane units expressed by $SiO_{4/2}$, and the component (A1) alone does not have hot-melt properties, and is a solid organopolysiloxane resin in a solvent-free state at 25° C. Herein, R represents a monovalent organic group, a hydroxyl group or an alkoxy group, and is preferably selected from curing reactive groups with a carbon-carbon double bond described later, monovalent hydrocarbon groups with 1 to 10 carbon atoms without a carbon-carbon double bond, hydroxyl groups, or alkoxy groups with 1 to 10 carbon atoms.

The curing reactive group having a carbon-carbon double bond may be a functional group having a carbon-carbon double bond such as a (meth)acryloxy group or the like, but is particularly preferably a hydrosilylation reactive functional group. Such a functional group can form a cured product in the presence of (C) an organohydrogen polysiloxane and (D) a photoactive hydrosilylation reaction catalyst described later.

Examples of such a curing reactive group include alkenyl groups with 2 to 10 carbons, and is particularly preferably a vinyl group or 1-hexenyl group.

Preferably, the percentage of alkenyl groups in component (A1) is within a range of 1 to 12 mol %, and preferably 2 to 10 mol %, of all silicon atom-bonded organic groups. If the alkenyl group content is less than the lower limit of the range described above, the mechanical strength (hardness and the like) of the resulting cured product may be insufficient. On the other hand, if the amount of alkenyl groups is at or below the upper limit of the range described above, the composition containing the component can achieve favorable hot-melt performance as an entire composition.

Component (A1) may contain another functional group that does not have a carbon-carbon double bond, and in particular, preferably contains a functional group selected from monovalent hydrocarbon groups with 1 to 10 carbon atoms that do not have a carbon-carbon double bond, and particularly preferably an alkyl group with 1 to 10 carbon atoms such as a methyl group or the like. On the other hand, component (A1) has a percentage of phenyl groups and the like of all silicon-bonded organic groups within a range of 0 to 5 mol %, more preferably within a range of 0 to 2 mol %, but most preferably does not contain aryl groups at all (=0 mol %). If a large amount of phenyl groups or other aryl groups are included, component (A1) itself may have hot-melt properties, the technical effect of the present invention may not be achieved, and in the cured product, an effect of reinforcing the cured product inherent to $SiO_{4/2}$ groups may be reduced.

Preferably, the functional group bonded to the silicon atom in component (A1) is a group selected from methyl groups, vinyl groups and other alkenyl groups. 70 to 99 mol % of all silicon-bonded organic groups are preferably methyl groups, 80 to 98 mol % are more preferably methyl groups, and 88 to 98 mol % are particularly preferably methyl groups, with any other organic groups bonded to a silicon atom being a vinyl group or other alkenyl group. In such a range, component (A1) is not hot-meltable alone, but is useful as a component that is particularly excellent in coloring resistance and the like at high temperatures of a cured product obtained from the curable silicone composition of the present invention. Note that a small amount of hydroxyl groups or alkoxy groups may be included in component (A1).

Component (A1) contains a siloxane unit expressed by $SiO_{4/2}$, which are branched units, making up at least 20 mol % of all siloxane units, preferably at least 40 mol % or more of all siloxane units, more preferably 50 mol % or more, and particularly preferably are within a range of 50 to 90 mol %. Note that R preferably represents a monovalent organic group, and particularly preferably a methyl group from the perspective of compatibility with other components. If the amount of the siloxane units expressed by $SiO_{4/2}$ is less than the aforementioned lower limit, a technical effect of the present invention may not be achieved even if the organopolysiloxane resin contains a large amount of another branched siloxane unit (for example, $RSiO_{3/2}$), for example.

Component (A1) may suitably be:

(A1-1) an organopolysiloxane resin expressed by the following average unit formula:

$$(R^1_3SiO_{1/2})_a(R^1_2SiO_{2/2})_b(R^1SiO_{3/2})_c(SiO_{4/2})_d(R^2O_{1/2})_e$$

(where each R1 independently represents a monovalent hydrocarbon group with 1 to 10 carbon atoms, but 1 to 12 mol % of all $R^1$ in one molecule represents an alkenyl group; each $R^2$ represents a hydrogen atom or an alkyl group with 1 to 10 carbon atoms; and a, b, c, d, and e represent numbers that satisfy $0.10 \le a \le 0.60$, $0 \le b \le 0.70$, $0 \le c \le 0.80$, $0.2 \le d \le 0.65$, $0 \le e \le 0.05$, but $c+d>0.20$ and $a+b+c+d=1$).

In the aforementioned average unit formula, each $R^1$ independently represents a monovalent hydrocarbon group having 1 to 10 carbon atoms, such as groups selected from a group consisting of: methyl groups and other alkyl groups with 1 to 10 carbons, particularly preferably methyl groups; vinyl groups and other alkenyl groups with 2 to 10 carbons; phenyl groups and other aryl groups; and benzyl groups and other aralkyl groups. Furthermore, 2 to 45 mol % of all $R^1$s in one molecule are alkenyl groups, and 2 to 35 mol % of all $R^1$s in one molecule are preferably alkenyl groups, and particularly preferably vinyl groups and/or 1-hexenyl groups. If the alkenyl group content is less than the lower limit of the range described above, the mechanical strength (hardness and the like) of the resulting cured product may be insufficient. On the other hand, if the amount of alkenyl groups is at or below the upper limit of the range above, a composition containing the present component can form a cured product with excellent mechanical strength. Note that each $R^1$ preferably represents a functional group selected from the alkyl groups and alkenyl groups above, but from the perspective of the technical effect of the present invention, the $R^1$ preferably does not substantially contain a phenyl group or other aryl group.

In the formula above, $R^2$ represents a hydrogen atom or an alkyl group having or 1 to 10 carbon atoms. The group $R^2O_{1/2}$ containing the $R^2$ corresponds to a hydroxyl group or alkoxy group of the organopolysiloxane resin of component (A1).

In the formula above, "a" represents a number indicating the percentage of siloxane units in the general formula: $R^1_3SiO_{1/2}$. "a" satisfies $0.1 \le a \le 0.90$, and preferably satisfies $0.15 \le a \le 0.85$. If "a" is within the above range, the curable silicone composition containing this component can be provided with favorable hot-melt properties, and a cured product thereof will have excellent adhesive properties and mechanical strength (hardness, elongation, and the like).

In the formula above, "b" represents a number indicating the percentage of siloxane units in the general formula: $R^1{}_2SiO_{2/2}$. "b" is a value that satisfies 0≤b≤0.70, and preferably satisfies 0≤b≤0.60. If "b" is at or below the upper limit of the aforementioned range, the curable silicone composition containing this component will have favorable hot-melt properties, and the composition will be less sticky at room temperature. In the present invention, "b" may be 0 and is preferably 0.

In the formula above, "c" represents a number indicating the percentage of siloxane units in the general formula: $R^3SiO_{3/2}$. "c" is a value that satisfies 0≤c≤0.80, and preferably satisfies 0≤c≤0.75. If "c" is at or below the upper limit of the aforementioned range, the curable silicone composition containing this component will have favorable hot-melt properties, the composition will be less sticky, and the surface will have low tack at room temperature. In the present invention, "c" may be 0 and is preferably 0.

In the formula above, "d" represents a number indicating the percentage of siloxane units with the formula $SiO_{4/2}$, and must satisfy the equation 0.20≤d≤0.65, preferably satisfies 0.25≤d≤0.65, and particularly preferably satisfies 0.40≤d≤0.65. If "d" is within the aforementioned numerical value range, the composition containing this component can achieve favorable hot-melt performance as a whole composition, and a cured product obtained by curing the composition can be relatively hard and have sufficient flexibility for practical use.

In the present invention, the equation c+d>0.20 must be satisfied. If the value of c+d is 0.20 or less, favorable hot-melt performance cannot be achieved for the composition as a whole, and a technical effect of the present invention may not be sufficiently achieved.

In the formula above, "e" is a number indicating the percentage of units in the general formula: $R^2O_{1/2}$, where the units are a hydroxyl group or alkoxy group bonded to a silicon atom that can be included in the organopolysiloxane resin. "e" satisfies the equation 0≤e≤0.05, and preferably satisfies 0≤e≤0.03. Note that in the formula above, the sum of "a", "b", "c", and "d", which is the sum of each siloxane unit, is equal to 1.

Component (A1) is a solid at room temperature; therefore, in order to physically blend with the component (B) described later, component (A1) is preferably used in a state of being dissolved in a solvent or solvent mixture selected from a group consisting of: toluene, xylene, mesitylene, and other aromatic hydrocarbons; tetrahydrofuran, dipropyl ether, and other ethers; hexamethyldisiloxane, octamethyltrisiloxane, decamethyltetrasiloxane, and other silicones; ethyl acetate, butyl acetate, propylene glycol monomethyl ether, and other esters; acetone, methyl ethyl ketone, methyl isobutyl ketone, and other ketones; and the like. The solvent used herein can be efficiently removed in a process described later.

Organopolysiloxane Resin (A2) without a Curing Reactive Functional Group

Component (A2) is one of the main agents of the present composition, does not have a curing reactive functional group containing a carbon-carbon double bond, has at least 20 mol % or more of all siloxane units as siloxane units expressed by $SiO_{4/2}$, and component (A2) alone does not have hot-melt properties, and is a solid organopolysiloxane resin in a solvent-free state at 25° C. By using component (A2) in combination with component (A1) and component (B) within a prescribed quantitative range, it is possible to achieve hot-melt properties for the curable silicone composition as a whole, and this component can provide excellent stress relaxation properties to the cured product obtained by curing the curable silicone composition.

Component (A2) does not contain a curing reactive functional group containing a carbon-carbon double bond such as an alkenyl group or the like in a molecule, while preferably containing a monovalent hydrocarbon group with 1 to 10 carbon atoms without a carbon-carbon double bond, and particularly preferably a functional group selected from methyl groups and other alkyl groups with 1 to 10 carbon atoms, and aryl groups. On the other hand, component (A2) preferably has a percentage of phenyl groups and other aryl groups in all silicon-bonded organic groups within a range of 0 to 5 mol %, more preferably within a range of 0 to 2 mol %, and most preferably does not contain aryl groups at all (=0 mol %). If the amount of aryl groups in component (A2) exceeds the aforementioned upper limit (if a large amount of phenyl groups or other aryl groups are included), component (A2) itself may have hot-melt properties, the technical effect of the present invention may not be achieved, and in the cured product, an effect of reinforcing the cured product inherent to $SiO_{4/2}$ groups may be reduced, and deterioration of coloring resistance of the cured product may occur under high temperatures.

Preferably, 70 to 100 mol % of the silicon atom-bonded organic groups in component (A2) are preferably methyl groups, 80 to 100 mol % are more preferably methyl groups, and 88 to 100 mol % are particularly preferably methyl groups. Within this range, component (A2) can be a component that does not exhibit hot-melt properties alone, and that particularly has an excellent reinforcing effect of a cured product containing siloxane units expressed by $SiO_{4/2}$. Note that the organopolysiloxane resin of component (A2) may contain a small amount of hydroxyl groups or alkoxy groups.

Component (A2) is an organopolysiloxane resin that is solid at 25° C. in a solvent-free state, and contains a siloxane unit expressed by $SiO_{4/2}$ making up at least 20 mol % or more of all siloxane units, which is a branched siloxane unit, in a molecule. Preferably, the $SiO_{4/2}$ unit of the organopolysiloxane of component (A2) is at least 40 mol %, more preferably 50 mol % or more, and particularly preferably within a range of 50 to 65 mol % of all siloxane units.

Preferably, component (A2) is (A2-1) an organopolysiloxane resin expressed by the following average unit formula:

$$(R^3{}_3SiO_{1/2})_f(R^3{}_2SiO_{2/2})_g(R^3SiO_{3/2})_h(SiO_{4/2})_i(R^2O_{1/2})_j$$

(where each $R^3$ independently represents a monovalent hydrocarbon group having 1 to 10 carbon atoms and not containing a carbon-carbon double bond; $R^2$ is a hydrogen atom or an alkyl group having 1 to 10 carbon atoms; and f, g, h, i, and j are numbers satisfying the following: 0.35≤f≤0.55, 0≤g≤0.20, 0≤h≤0.20, 0.45≤i≤0.65, 0≤j≤0.05, and f+g+h+i=1).

In the average unit formula above, $R^2$ represents the same group as above, and is preferably a hydrogen atom or a methyl group. $R^3$ independently represents a monovalent hydrocarbon group having 1 to 10 carbon atoms and containing no carbon-carbon double bond, such as a methyl or other alkyl group. Herein, it is particularly preferred from the perspective of industrial production and the technical effect of the invention that 70 mol % or more, and more preferably 88 mol % or more of the total $R^3$ in one molecule is a methyl group or other alkyl group with 1 to 10 carbon atoms, and particularly a methyl group. On the other hand, $R^3$ is preferably substantially free of phenyl groups and other aryl groups.

In the formula above, "f" represents a number indicating the percentage of siloxane units in the general formula: $R^3_3SiO_{1/2}$. "f" satisfies $0.35 \le f \le 0.55$, and preferably $0.40 \le f \le 0.50$. If "f" is within the range above, the curable silicone composition containing this component can be provided with favorable hot-melt properties, and a cured product thereof will have excellent adhesive properties and mechanical strength (hardness and the like).

In the formula above, "g" represents a number indicating the percentage of siloxane units in the general formula: $R^1_2SiO_{2/2}$. "g" is a value that satisfies $0 \le g \le 0.20$, and preferably satisfies $0 \le g \le 0.10$. If "g" is at or below the upper limit of the range, the curable silicone composition containing this component will have favorable hot-melt properties, and the composition will be less sticky at room temperature. In the present invention, "g" may be 0 and is preferably 0.

In the formula above, "h" represents a number indicating the percentage of siloxane units in the general formula: $R_1SiO_{3/2}$. "h" is a value that satisfies $0 \le h \le 0.20$, and preferably satisfies $0 \le h \le 0.10$. If "h" is at or below the upper limit of the range, the curable silicone composition containing this component will have favorable hot-melt properties, the composition will be less sticky, and the surface will have low tack at room temperature. In the present invention, "h" may be 0 and is preferably 0.

In the formula above, "i" represents a number indicating the percentage of $SiO_{4/2}$ siloxane units, and preferably satisfies $0.30 \le i \le 0.65$, and particularly preferably satisfies $0.50 \le i \le 0.65$. When "i" is within the numerical value range, the curable silicone composition containing this component can achieve favorable hot-melt performance as a whole composition, and thus a composition can be achieved, which has excellent mechanical strength of a cured product obtained by curing the curable silicone composition, has no stickiness as a whole composition, and has favorable handling workability.

In the formula above, "i" is a number indicating the percentage of units of the general formula: $R^2O_{1/2}$, where the units are a hydroxyl group or alkoxy group bonded to a silicon atom that can be included in the organopolysiloxane resin. "j" is a value that satisfies $0 \le j \le 0.05$, and preferably satisfies $0 \le j \le 0.03$. Note that in the formula above, the sum of "f", "g", "h", and "i", which is the sum of each siloxane unit, is equal to 1.

Component (A2) is solid at room temperature and is preferably used in a form dissolved in a solvent or solvent mixture for physical mixing with component (B) described later. Herein, the type of solvent is the same as that of component (A1).

Component (A)

The curable silicone composition according to the present invention contains as component (A) the aforementioned components (A1) and (A2) at a mass ratio of 20:80 to 90:10, preferably 35:65 to 90:10, more preferably 50:50 to 90:10. Herein, although each component of component (A) does not itself have hot-melt properties, hot-melt properties of the whole composition can be achieved by concomitantly using component (B) described later in a prescribed mass ratio range. By using component (A1) in combination with component (A2) in the present composition, it is possible to adjust to a certain degree the storage elastic modulus, loss elastic modulus, and tan δ calculated from the ratio therefrom of a cured product obtained by curing the curable composition, thereby achieving an elastic modulus, flexibility, and stress relaxation properties that are suitable for the cured product.

Component (A) and constituent components (A1) and (A2) preferably have a mass loss ratio of 2.0 mass % or less when exposed to 200° C. for 1 hour. These components are organopolysiloxane resins containing M units ($R^3_3SiO_{1/2}$) and Q units ($SiO_{4/2}$), and volatile low molecular weight components, specifically $M_4Q$ structures, are generated as by-products during the polymerization process. However, this structure has significantly reduced strength of a cured product obtained from the curable silicone composition of the present invention, and if a curable silicone composition containing the $M_4Q$ structure is molded together with a substrate of a semiconductor or the like, and then exposed to a high temperature to remove the $M_4Q$ structure, the volume of a cured product resulting from the curable silicone composition may decrease and the hardness of the cured product may significantly increase, resulting in changes in dimensions of a molded product, warping, and the like. Furthermore, there is a possibility that the tackiness of the surface of the cured product may increase. Furthermore, if a large amount of $M_4Q$ structure remains in the composition or cured product, a marked increase in hardness may also occur in the adhesive layer or sealing layer for double-sided adhesion, and the elastic modulus may change significantly. Therefore, in order to apply the curable silicone compositions of the present invention to applications laminated with a substrate of a semiconductor or the like, the $M_4Q$ structure is preferably removed from the organopolysiloxane resin at the point of a raw material prior to a molding process of curing with the curable silicone composition by laminating with a substrate, and, if possible, prior to preparing the curable silicone composition.

However, the $M_4Q$ structure is highly compatible with organopolysiloxane resins, and it is difficult to remove volatile low molecular weight components, specifically the $M_4Q$ structure, from component (A) and the like under drying conditions that remove organic solvents. Therefore, since volatile components can be removed by treating the resulting crude raw material, organopolysiloxane resin, for a short time at a high temperature of approximately 200° C., volatile components such as organic solvents and $M_4Q$ structures and the like can be simultaneously removed from components (A1) and (A2) using a twin-screw kneader or the like set at a temperature of 200° C. or higher, and thereby, volatile low molecular weight components in component (A) are removed from the raw material before the curable silicone composition is prepared, and thus component (A) preferably has a mass loss ratio of 2.0 mass % or less after 1 hour of exposure at 200° C., but the mass loss ratio is more preferably 1.0 mass % or less.

Note that from the perspective of efficient production of the curable hot-melt silicone composition of the present invention, component (B), described later, is preferably added to component (A) that is dissolved in an organic solvent, and the mixture is fed in a liquid state into a twin-screw extruder set at 200° C. or higher, and a process of removing volatile components such as $M_4Q$ structures and the like is performed. This method enables obtaining a mixture of component (A) and component (B) having hot-melt properties, which can be used for kneading in the remaining components included in the curable silicone composition in a process described later.

Component (B)

Component (B) is one of the main agents of the present curable silicone composition, and is a linear organopolysiloxane that is liquid at 25° C. and has a curing reactive functional group containing at least two carbon-carbon double bonds in a molecule. Such a curing reactive chain organopolysiloxane, when concomitantly used with the solid organopolysiloxane resin of component (A) described above, can exhibit hot-melt properties as an entire composition.

Component (B) must have a curing reactive functional group having a carbon-carbon double bond in a molecule. Such a curing reactive functional group is hydrosilylation reactive, and forms a cured product by a crosslinking reaction with another component. Such a curing reactive functional group is preferably an alkenyl group similar to that provided by component (A1), and particularly preferably a vinyl group or hexenyl group.

Component (B) is a raw rubber-like chain organopolysiloxane that is liquid or plastic at 25° C. (room temperature) and, when used in combination with component (A), imparts the composition of the present invention with hot-melt properties. The chemical structure of the organopolysiloxane of component (B) is linear or branched, and may have a branched polysiloxane structure using a few T units or Q units, but preferably is a linear diorganopolysiloxane expressed by the following structural formula (B1):

$$R^4_3SiO(SiR^4_2O)_kSiR^4_3$$

(where each $R^4$ independently represents a monovalent hydrocarbon group having 1 to 10 carbon atoms, except that at least two of the $R^4$ in one molecule are an alkenyl group, and k is a number from 20 to 1,000).

A linear diorganopolysiloxane having an alkenyl group, and particularly preferably a vinyl group at each end of the molecular chain is preferred.

In the formula above, each $R^4$ independently represents a monovalent hydrocarbon group having 1 to 10 carbon atoms, such as groups selected from a group consisting of: methyl and other alkyl groups, and particularly preferably methyl groups; vinyl and other alkenyl groups, and particularly preferably vinyl groups and/or hexenyl groups; phenyl and other aryl groups; and benzyl and other aralkyl groups. Furthermore, at least two of the $R^4$ in one molecule are alkenyl groups, and preferably a vinyl group. Furthermore, each $R^4$ is preferably a functional group selected from a group consisting of methyl groups and other alkyl groups with 1 to 10 carbon atoms and vinyl groups, hexenyl groups and other alkenyl groups, and it is preferable that of all $R^4$s, at least two are alkenyl groups per molecule, and the remaining $R^4$ are methyl groups. Note that from the perspective of a technical effect of the invention, $R^4$ is preferably substantially free of phenyl groups and other aryl groups. If a large amount of phenyl groups or other aryl groups are included, the coloring resistance at high temperatures of the cured product obtained from the curable silicone composition may deteriorate. Particularly preferably, a vinyl group or other alkenyl group is preferred at each end of a molecular chain, with the rest of $R^4$ being a methyl group.

In the formula above, "k" represents a number between 20 and 5,000, preferably between 30 and 3,000, and particularly preferably between 45 and 800. If "k" is at or above the lower limit of the aforementioned range, a curable silicone composition having little stickiness at room temperature can be obtained. On the other hand, if "k" is at or below the upper limit of the aforementioned range, the curable silicone composition as a whole can achieve a favorable hot-melt performance.

The added amount of component (B) is within a range of 10 to 100 parts by mass, preferably within a range of 50 to 100 parts by mass, and more preferably within a range of 70 to 100 parts by mass, with regard to 100 parts by mass of component (A). If the amount of component (B) is within the aforementioned range, the resulting curable silicone composition will exhibit hot-melt properties suitable for hot dispensing processes, have excellent handling workability due to reduced stickiness at room temperature, and improved mechanical strength of the cured product obtained by curing the composition.

Component (C)

Component (C) is an organohydrogen polysiloxane having at least two silicon atom-bonded hydrogen atoms in a molecule, and is a crosslinking agent that cures the composition by addition reaction (hydrosilylation reaction) with the carbon-carbon double bond in components (A1) and (B) in the presence of component (D).

The structure of the crosslinking agent, organohydrogen polysiloxane, is not particularly limited and may be linear, branched-chain, cyclic, or resinous. In other words, component (C) may be an organohydrogenpolysiloxane having, as a main constituent unit, a hydrogen organosiloxy unit expressed by $HR_2SiO_{1/2}$ ($D^H$ unit, wherein R is independently a monovalent organic group), and at an end thereof a hydrogen diorganosiloxy unit expressed by $HR_2SiO_{1/2}$ (MH unit, wherein R is independently a monovalent organic group), and component (C) may be a chain organohydrogen polysiloxane containing the $D^H$ units and the like.

On the other hand, when the curable silicone composition is used in a molding process, since the amount of the curing reactive functional group containing a carbon-carbon double bond in the present composition is small, from the perspective of curing rate, moldability, and curing curability thereof, the organohydrogen polysiloxane is preferably an organohydrogen polysiloxane resin containing a monoorganosiloxy unit expressed by $RSIO_{3/2}$ (T unit, where R represents a monovalent organic group or a silicon atom-bonded hydrogen atom) or a branched unit of a siloxy unit (Q unit) expressed by $SiO_{4/2}$, having at least two hydrogen diorganosiloxy units expressed by $HR_2SiO_{1/2}$ ($M^H$ unit, where R independently represents a monovalent organic group) in a molecule, and having the $M^H$ unit at a molecular terminal.

Component (C) according to the present invention is preferably an organohydrogen polysiloxane with low volatility, and more specifically, it may be characterized by having minimal volatile low molecular weight contents, with a mass loss ratio of 10 mass % or less after exposure to 100° C. for 1 hour under atmospheric pressure, as compared to before exposure. As described later, each component of the curable silicone composition, as well as the composition obtained thereby is preferably melted and kneaded within a temperature range of 50 to 150° C. under reduced pressure during the production process of filling cartridges with the curable silicone composition of the present invention, in order to obtain a composition that is free of voids, or the like. However, if a large amount of the components that compose the composition volatilize under these kneading conditions, it may not be possible to obtain a composition with the designed properties, even after heating for a very short period of time. In particular, the amount of organohydrogen polysiloxane, which is a crosslinking agent, added to the total mass of the curable silicone composition is small, so the properties of the composition (curing properties, physical properties of the cured product, and the like) can vary greatly from the intended values due to volatilization of the component; therefore, with regard to component (C), it is particularly preferable to select an organohydrogen polysiloxane with low volatility, based on the use and manufacturing method (in particular, filling cartridges, pails, or drums).

A particularly suitable organohydrogen polysiloxane is an organohydrogen polysiloxane resin expressed by the following average unit formula (1):

$$(R^5{}_3SiO_{1/2})_l(R^6{}_2SiO_{2/2})_m(R^6SiO_{3/2})_n(SiO_{4/2})_p(R^2O_{1/2})_q$$

In the formula, each $R^5$ is the same or different hydrogen atom or monovalent hydrocarbon group with 1 to 10 carbon atoms without an aliphatic unsaturated carbon bond, where at least two $R^5$ in one molecule are hydrogen atoms. A monovalent hydrocarbon group corresponding to $R^5$ except for hydrogen atoms includes, for example: methyl and other alkyl groups; phenyl and other aryl groups; benzyl and other aralkyl groups; other halogenated alkyl groups; and the like. From an industrial viewpoint, methyl groups or phenyl groups are preferred.

In the formula, $R^6$ represents a monovalent hydrocarbon group with 1 to 10 carbon atoms without an aliphatic unsaturated carbon bond, and examples include the same groups as the monovalent hydrocarbon group described above. On the other hand, $R^2$ is a hydrogen atom or an alkyl group having 1 to 10 carbon atoms, and examples include the same groups as those suggested for $R^2$ in the above component (A1) or component (A2).

In the formula, l, m, n, and p are numbers that satisfy $0.01 \leq l \leq 0.6$, $0 \leq m$, $0 \leq n \leq 0.9$, $0 \leq p \leq 0.9$, and $l+m+n+p=1$, and preferably $0 \leq q \leq 0.05$ and $n+p \geq 0.2$. Specific examples of the organohydrogen polysiloxane resin, which is component (C), include $M^HMT$ resins, $M^HT$ resins, $M^HMTQ$ resins, $M^HMQ$ resins, $M^HDQ$ resin, $M^HQ$ resins, and the like. In the notation of the resin above, M, D, T, and Q represent a M unit, D unit, T unit, and Q unit, respectively, and $M^H$ represents an M unit with a hydrogen atom.

Component (C) is preferably an organohydrogen polysiloxane containing Q units expressed by the following average unit formula (2).

Average unit formula (2):

$$(HR^6{}_2SiO_{1/2})_e(R^6{}_2SiO_{2/2})_f(SiO_{4/2})_g$$

In the formula, $R^6$ independently represents an unsubstituted or substituted monovalent hydrocarbon group that does not contain an aliphatic unsaturated bond with 1 to 12 carbon atoms, and "e", "f", and "g" represent numbers that satisfy conditions of $0.01 \leq e \leq 0.6$, $0 \leq f \leq 0.9$, $0.2 \leq g \leq 0.9$, and $e+f+g=1$. Specific examples of the monovalent hydrocarbon group include the same as those indicated as specific examples of the monovalent hydrocarbon group expressed by $R^4$ in average compositional formula (1) above. $R^6$ preferably independently represents a group selected from methyl groups and phenyl groups.

Similarly, component (C) is preferably an organohydrogen polysiloxane containing T units expressed by the following average unit formula (3).

Average unit formula (3):

$$(HR^7{}_2SiO_{1/2})_h(R^7{}_2SiO_{2/2})_i(R^8SiO_{3/2})_j$$

In the formula, $R^7$ and $R^8$ each independently represent an unsubstituted or substituted monovalent hydrocarbon group that does not contain an aliphatic unsaturated bond with 1 to 12 carbon atoms, at least 10 mol % of all $R^8$ s represent aryl groups, and h, i, and j represents numbers that satisfy conditions of $0.01 \leq h \leq 0.6$, $0 \leq i \leq 0.9$, $0.2 \leq j \leq 0.9$, and $h+i+j=1$.

Specific examples of the monovalent hydrocarbon group include the same groups as those indicated as specific examples of the monovalent hydrocarbon group in average unit formula (1). $R^8$ preferably independently represents a group selected from methyl groups and phenyl groups, provided that at least 10 mol % of all $R^8$ s is a phenyl group.

The organohydrogen polysiloxane resins expressed by the average unit formulas (2) or (3) may be used alone or in combination.

The amount of the organohydrogen polysiloxane of component (C) in the curable silicone composition of the present invention is an amount sufficient to cure the curable silicone composition. For the curing reactive functional groups (such as vinyl groups or other alkenyl groups) containing a carbon-carbon double bond in component (A) and component (B), the amount of hydrogen atoms bonded to silicon atoms in the organohydrogen polysiloxane of component (C) is an amount where the number of silicon atom-bonded hydrogen atoms per one alkenyl group for alkenyl groups bonded to silicon atoms included in the entire curable silicone composition is 0.5 to 20.0, and particularly preferably within a range of 1.0 to 10.

Component (D)

Component (D) is one of the characteristic components of the curable silicone composition according to the present invention, and is a hydrosilylation reaction catalyst for curing the curable silicone composition of the present invention by crosslinking a curing reactive functional group containing a carbon-carbon double bond included in components (A)/(B) with a silicon atom-bonded hydrogen atom (Si—H group) included in component (C); and specifically, is a hydrosilylation reaction catalyst that is in inert and does not exhibit catalytic activity at room temperature when not subjected to an external energy stimulus, but is activated in the composition by an external energy stimulus. Herein, the external energy stimulus may be thermal energy such as exposure to high temperature or the like, light energy such as irradiation with a high energy beam or the like, and physical energy such as vibration, impact, or the like applied on the composition from the outside. In the present invention, depending on the type of component (D), irradiation with a high energy beam and exposure to a high temperature (preferably, 130° C. or higher) are representative external energy stimuli. These energy stimuli preferably trigger the catalytic activity for the hydrosilylation reaction, the curing reaction of the entire composition.

Component (D) is not particularly limited so long as the aforementioned properties are provided, but for practical use, one or more type of hydrosilylation reaction catalysts selected from (D1) hydrosilylation reaction catalysts exhibiting activity in the composition by irradiation with a high energy beam and (D2) thermoplastic resin microparticles containing a hydrosilylation reaction catalyst are particularly preferable. Furthermore, component (D) can be suitably selected based on the composition of the curable silicone composition according to the present invention (for example, whether or not the composition before curing contains light-shielding or light-absorbing components) and the type of curing process, and both types may be used together as appropriate, depending on the curing process.

Component (D1) is one form of component (D), and is a so-called high energy beam activated catalyst or photoactivated catalyst, which is known in this technical field. The photoactive hydrosilylation reaction catalyst that is component (D1) is not activated even in a heated and molten state, unless irradiated with a high energy beam such as UV rays or the like, while the curing reaction proceeds smoothly at low temperatures such as room temperature or the like, without heating, after irradiation with a high energy beam.

Therefore, although the composition according to the present invention as a whole can be immediately cured at low temperature when triggered by irradiation of a high energy beam, the composition has excellent storage stability, and can be suitably applied to hot dispensing processes that require exposure of the composition at temperatures of 50° C. or higher, and the reaction is easily controlled; therefore, properties such as excellent handling workability can be achieved. Furthermore, the catalytic activity of the component (D1) is suppressed during the heating and melting process for a short period of time, and therefore the curable silicone composition can be melted and kneaded within a temperature range of 50 to 150° C. under reduced pressure without losing storage stability in the production process of filling cartridges with the curable silicone composition of the present invention, and it is possible to fill dispenser cartridges, pails, or drums.

Furthermore, component (D1) has the property of homogeneous compatibility with the curable silicone composition, enabling easy design of compositions and cured products with excellent transparency (for example, light transmissivity).

Examples of high energy beams include UV rays, gamma rays, X-rays, alpha rays, electron beams, and the like. In particular, examples include UV rays, X-rays, and electron beams irradiated from a commercially available electron beam irradiating device. Of these, UV rays are preferable from the perspective of efficiency of catalyst activation, and UV rays within a wavelength range of 280 to 380 nm are preferable from the perspective of industrial use. Furthermore, the irradiation dose varies depending on the type of high energy beam activated catalyst, but in the case of UV rays, the integrated irradiation dose at a wavelength of 365 nm is preferably within a range of 100 mJ/cm$^2$ to 100 J/cm$^2$.

Specific examples of component (D1) include (methylcyclopentadienyl) trimethyl platinum (IV), (cyclopentadienyl) trimethyl platinum (IV), (1,2,3,4,5-pentamethyl cyclopentadienyl) trimethyl platinum (IV), (cyclopentadienyl) dimethylethyl platinum (IV), (cyclopentadienyl) dimethylacetyl platinum (IV), (trimethylsilyl cyclopentadienyl) trimethyl platinum (IV), (methoxycarbonyl cyclopentadienyl) trimethyl platinum (IV), (dimethylsilyl cyclopentadienyl) trimethylcyclopentadienyl platinum (IV), trimethyl (acetylacetonato) platinum (IV), trimethyl (3,5-heptanedionate) platinum (IV), trimethyl (methylacetoacetate) platinum (IV), bis(2,4-pentanedionato) platinum (II), bis(2,4-hexanedionato) platinum (II), bis(2,4-heptanedionato) platinum (II), bis(3,5-heptanedionato) platinum (II), bis(1-phenyl-1,3-butanedionato) platinum (II), bis(1,3-diphenyl-1,3-propanedionato) platinum (II), and bis(hexafluoroacetylacetonato) platinum (II). Of these, (methylcyclopentadienyl) trimethyl platinum (IV) and bis(2,4-pentanedionato) platinum (II) are preferred from the perspective of versatility and ease of acquisition.

Component (D2) is another form of component (D) and can be either microparticles in which the hydrosilylation reaction catalyst represented by a platinum-based catalyst is dissolved or dispersed in the thermoplastic resin, or microcapsule microparticles with a structure in which the platinum-based catalyst is included as a core in a thermoplastic resin shell. Herein, the thermoplastic resin is a wall material of the hydrosilylation reaction catalyst. At room temperature to low temperature (near the dispensing temperature), the hydrosilylation reaction catalyst in the particles is inactivated by the wall material so as to not disperse in the system, but at high temperatures (for example, 130° C. or higher or the like), the thermoplastic resin, which is the wall material, melts, the hydrosilylation reaction catalyst is dispersed and activated in the system, and thus the curing reaction proceeds based on the hydrosilylation reaction.

Examples of the platinum-based catalyst included in component (D2) include platinum black, platinum-supported carbon fine powders, platinum-supported silica fine powders, platinum chlorides, alcohol modified platinum chlorides, platinum olefin complexes, and platinum alkenylsiloxane complexes. Furthermore, the thermoplastic resin is not particularly limited so long as it is substantially impermeable to platinum-based catalysts, at least during storage, and is not substantially soluble in organopolysiloxane, a main component of the composition, but preferable examples include silicone resins, polysilane resins, acrylic resins, methyl cellulose, and polycarbonate resins. The thermoplastic resin preferably has a softening point or glass transition temperature within a range of 40 to 200° C. The softening point is the temperature at which a resin begins to flow under its own weight or by its own surface tension, and can be measured by a method of observing pulverized particles under a microscope while increasing the temperature at a constant rate. Furthermore, the glass transition temperature can be measured by a DSC (differential scanning calorimeter). In the present invention, either the softening point or the glass transition temperature is preferably in a range of 100 to 200° C., more preferably in the range of 130 to 200° C., since the curable silicone composition is briefly exposed to temperatures of approximately 100° C. by the production process described later. This is because if the softening point or glass transition temperature of the thermoplastic resin is less than 100° C., the catalyst will tend to be activated during production of the curable silicone composition, resulting in a significant decrease in storage stability, while if the softening point or glass transition temperature exceeds 200° C., a sufficient heat curing rate might not be obtained. Furthermore, the average particle size of the thermoplastic microparticles containing the platinum-based catalyst is not limited, but is preferably in a range of 0.1 to 500 μm, and more preferably in a range of 0.3 to 100 μm. This is because preparing thermoplastic resin microparticles containing a hydrosilylation reaction catalyst with an average particle size below the lower limit of the above range is difficult, but dispersibility in the curable silicone resin composition is reduced if the average particle diameter exceeds the upper limit of the above range.

Component (D2) in the present invention is preferably thermoplastic resin microparticles containing a hydrosilylation reaction catalyst that uses a thermoplastic resin with a softening point or glass transition temperature of 130° C. or higher, preferably within a range of 130 to 200° C., such as a thermoplastic resin at least partially containing a polycarbonate resin. In this case, melting of the thermoplastic resin which is the wall material is suppressed at 130° C. or lower, so the hydrosilylation reaction catalyst remains inactivated at the normal melt-kneading process and dispensing temperature, which is particularly excellent for storage stability and reaction control.

Note that (D2) thermoplastic resin microparticles containing a hydrosilylation reaction catalyst basically do not mutually dissolve with the curable silicone composition, and thus transparent compositions cannot be obtained, so it may be difficult to design a composition with excellent transparency and light transmissivity when using component (D2).

The method of preparing the thermoplastic resin microparticles containing the platinum-based catalyst is not limited, and examples include conventionally known chemical methods such as interfacial polymerization and in-situ polymerization and the like, and physical and mechanical methods such as coacervation, drying in liquid, and the like. The drying in liquid method and vapor phase drying method are particularly desirable because obtaining microcapsule microparticles with a narrow particle size distribution will be relatively easy. The microparticles obtained by these methods can be used as they are, but it is desirable to wash the microparticles with an appropriate cleaning solvent to remove the platinum-based catalyst attached to the surface, in order to obtain a curable silicone composition with excellent storage stability. Herein, an appropriate cleaning solvent is one that does not dissolve the thermoplastic resin, but has a property of dissolving the platinum-based catalyst. Such cleaning solvents include, for example, alcohols such as methyl alcohol and ethyl alcohol, and low molecular weight organopolysiloxanes such as hexamethyldisiloxane and the like. The ratio of hydrosilylation reaction catalyst to thermoplastic resin is not particularly limited, because the value varies greatly depending on the method of manufacturing granular materials, but the ratio is preferably such that the amount of platinum-based catalyst to thermoplastic resin is 0.01 mass % or more. This is because if the amount of platinum-based catalyst is less than 0.01 mass %, the physical properties of the cured product of this composition will be impaired unless a large amount of thermoplastic resin microparticles containing the platinum-based catalyst is included in the composition.

As described above, component (D) can be selected as appropriate based on the composition of the curable silicone composition according to the present invention (for example, whether or not the composition before curing contains light-shielding or light-absorbing components) and the type of curing process. For example, i) if the composition itself contains a large amount of light-shielding/light-absorbing/reflecting components (for example, white or black pigments, UV protection agents, and the like), ii) if irradiating the composition with a high energy beam in the curing process is difficult, and/or iii) if the composition and the cured product thereof are not required to be transparent (=light transmissivity) is not required, component (D2) is preferably selected as component (D) and cured by high temperature exposure.

On the other hand, i) if a curing reaction triggered by irradiation of a high energy beam is allowed in the curing process, ii) if high temperature exposure is not allowed due to the type of substrate (heat resistance, high temperature deformation, and the like), or curing process, and/or iii) if the composition and cured product require transparency (=light transmissivity), component (D1) is preferably selected and cured by triggering irradiation using a high energy beam. Note that, needless to say, it is also possible to combine both types and design a multi-step curing process/step.

The added amount of component (D) is a catalytic amount. Specifically, the amount is preferably such that the amount of metal atoms in component (D) is preferably in a range of 1 to 500 ppm, and more preferably in a range of 2 to 200 ppm, in mass units, with respect to the whole composition.

The composition according to the present invention may optionally contain other curing agents (for example, peroxides, photoinitiators, photosensitizers, and the like), and a hydrosilylation reaction catalyst other than a photoactive type may be included within a range in which the technical effects of the present invention are not impaired. However, for the above reasons, including prevention of voids and the like, these optional curable components are preferably substantially non-volatile.

Hydrosilylation Reaction Curing Retarder

In addition to components (A) to (D) above, the curable silicone composition of the present invention may further contain a hydrosilylation reaction curing retarder. The structure of the curing retarder is not particularly limited, but from the perspective of the technical effect of the present invention, use of (E) a hydrosilylation reaction curing retarder with a boiling point of 200° C. or higher under atmospheric pressure is particularly preferred. If a compound with a low boiling point is used as a curing retarder when melting and kneading raw materials under reduced pressure during a production process of the curable silicone composition sheet described below, a portion or all of the curing retarder may volatilize during the melting and kneading process, and thus a targeted effect of the curing retarding effect may not be achieved with the curable silicone composition.

The curing retarder of the present invention is not particularly limited, and examples include: 2-methyl-3-butyne-2-ol, 3,5-dimethyl-1-hexyne-3-ol, 2-phenyl-3-butyne-2-ol, 1-ethynyl-1-cyclohexanol, and other alkyne alcohols; 3-methyl-3-pentene-1-yne, 3,5-dimethyl-3-hexene-1-yne, and other enyne compounds; tetramethyltetravinylcyclotetrasiloxane, tetramethyltetrahexenylcyclotetrasiloxane, and other alkenyl group-containing low molecular weight siloxanes; and methyl tris(1,1-dimethyl propynyloxy)silane, vinyl tris(1,1-dimethyl propynyloxy)silane, and other alkynyloxysilanes. Of these, the use of (E) a curing retarder with a boiling point of 200° C. or higher under atmospheric pressure is particularly preferred, and for practical use, the use of alkynyloxysilanes such as methyl-tris(1,1-dimethylpropynyloxy)silane and vinyl-tris(1,1 dimethylpropynyloxy)silane, and the like is preferred. The amount of the curing retarder in the curable silicone composition is not particularly limited, but is preferably within a range of 1 to 10,000 ppm in mass units, with regard to the composition.

(F) Other Additives

In addition to the above components (A) to (D) and optional component (E), materials known in the art as additives that may be used in a silicone composition may be added to the curable silicone composition of the present invention. Herein, the additives that can be used include, but are not limited to, the following. Note that when melting and kneading raw materials under reduced pressure in the production process of the curable silicone composition and based on the technical effects of the present invention, it is particularly preferable that the other additives have a high boiling point or be a component that is substantially non-volatile.

(F1) Functional Filler

A functional filler can be used as an additive in order to improve the mechanical properties of a cured product obtained from the curable silicone composition of the present invention, to improve flame retardancy, or the like. Examples of these functional fillers include inorganic fillers, organic fillers, and mixtures thereof. Examples of the inorganic fillers include reinforcing fillers, pigments (particularly white pigments and black pigments), thermally conductive fillers, electrically conductive fillers, phosphors, and mixtures of at least two of these, and examples of organic fillers include a silicone resin filler, a fluorine resin filler, and a polybutadiene resin filler. Note that the shape of these fillers is not particularly limited and may be spherical, spindle-shaped, flat, needle-shaped, amorphous, or the like.

The type and amount of functional filler are preferably selected to be within a range in which the curable silicone composition of the present invention can be melted and kneaded and within a range that enables the technical effects of the present invention (such as curing properties, mechanical properties after curing, weather resistance, and the like).

One preferred form of the curable silicone composition of the present invention is one that is substantially free of functional fillers, and in particular, if the above-mentioned component (D1) is cured by triggering irradiation of a high energy beam to drive the curing reaction, the high energy beam may be shielded, absorbed, or reflected on the surface of the composition if functional fillers that are light-shielding or light-absorbing/reflecting, such as white or black pigments, are included at a large amount. Therefore, photoactivation of component (D1) may be hindered, and the curability of the composition may deteriorate significantly.

On the other hand, if the curable silicone composition contains light-shielding or light-absorbing/reflecting functional fillers (for example, black pigments, white pigments, and the like) as component (F1), the thermoplastic resin microparticles containing the hydrosilylation reaction catalyst, component (D2) mentioned above, are preferably used as the catalyst. This is because when such a filler is included, transparency or light transmissivity is basically not required, and the composition containing these pigments can be quickly cured by triggering exposure to high temperatures (for example, 130° C. or higher).

(F2) Adhesion Imparting Agent

The composition of the present invention may contain an adhesion imparting agent so long as the object of the present invention is not impaired. Such adhesion imparting agents are common to components suitably exemplified by the present applicant in the international patent application (PCT/JP2020/12027), and reaction mixtures of epoxy group-containing organoalkoxysilane and amino group-containing organoalkoxysilane disclosed in Japanese Examined Patent Application Publication S52-8854 and Japanese Unexamined Patent Application H10-195085, and particularly carbasilatrane derivatives having a silicon atom-bonded alkoxy group or silicon atom-bonded alkenyl group in one molecule, silatrane derivatives having an alkoxysilyl group-containing organic group, and the like can be preferably used in addition to 3-glycidoxypropyltrimethoxysilane and other silane compounds, organosiloxane oligomers, and alkyl silicates. The amount of the adhesion imparting agent is not limited, but is preferably within a range of 0.01 to 10 parts by mass relative to 100 parts by mass total of the present composition.

Other Optional Components

Furthermore, the composition may contain, as other optional components, heat resistance agents such as iron oxide (red iron oxide), cerium oxide, cerium dimethyl silanolate, fatty acid cerium salt, cerium hydroxide, zirconium compound, and the like; and in addition, dyes, pigments other than white, flame retardancy imparting agents, and the like.

Shape Retention and Melt Viscosity of Composition

The curable silicone composition according to the present invention is a solid that retains its shape at 25° C. However, as mentioned above, the composition has hot-melt properties, and in particular, the melt viscosity (measured with a flow tester: outlet nozzle diameter 1 mm, pressure 2.5 MPa) at 100° C. must be 50 Pa-s or less. Note that shape retention means that the material does not substantially deform or flow in the absence of an external force, and may be a solid or raw rubber-like solid that can be deformed or plasticized by applying an external force.

The curable silicone composition according to the present invention has a property of rapidly melting and decreasing viscosity in conjunction with increasing temperature under high temperature and high pressure conditions in the manufacturing process of the laminate body or the like, and the melt viscosity is preferably measured under high pressure using a flow tester such as a Koka-type flow tester (manufactured by Shimadzu Corporation). Specifically, the present composition preferably has a melt viscosity at 100° C. of 50 Pa-s or less, and more preferably 30 Pa-s or less, as measured using a Koka-type flow tester with an outlet nozzle diameter of 1 mm and a pressure of 2.5 MPa. This is because a melt viscosity within the above mentioned range provides favorable dispensability at 100° C.

Manufacturing Method and Form of Filling Cartridge, Pail and Drum

The curable silicone composition of the present invention can be manufactured by heating and melting, and then uniformly mixing components (A) to (D), along with (E) and other optional components, and then cooling if necessary. However, the composition may be manufactured by any method, not limited to this method. The mixer that can be used with this manufacturing method is not particularly limited, and examples can include: batch type mixers with heating and cooling functions, such as kneaders, Banbury mixers, Henschel mixers, planetary mixers, two-roll mills, three-roll mills, Ross mixers, Labo Plastomills, and the like; and continuous type heating and kneading devices with heating and cooling functions, such as single-screw extruders, twin-screw extruders, and the like. The curable silicone composition according to the present invention is particularly suitable for use in a form of being filled in cartridges, pails, or drums, heated, and dispensed using a dispenser; therefore, it is particularly preferable to manufacture the composition using a single-shaft or twin-shaft continuous mixer, from the perspective of being able to continuously fill the containers.

The curable silicone composition according to the present invention is particularly preferably used in a form filled in cartridges, pails, or drums filled for dispensing. These cartridges, pails, and drums containing the curable silicone composition are obtained by continuously filling the containers with curable silicone compositions using a manufacturing method including process P1 and process P2 described below.

- Process P1: a process mixing components of the curable hot-melt silicone composition, preferably at a temperature of 50° C. or higher;
- Process P2: a process of continuously filling cartridges, pails or drums with the heated and melted mixture obtained in process P1 by dispensing through a nozzle Process P1

Process P1 is a process of kneading the components of the composition of the present invention while heating and melting. By heating and kneading the heat-meltable mixture at a temperature above the softening point, suitably in a temperature range of 50° C. to 200° C., the entire composition is melted or softened and mixed, and thus the components included in the mixture can be uniformly mixed. The mixture obtained in process P1 is a uniformly mixed composition, which can be filled into cartridges, pails, or drums in process P2 to produce cartridges, pails, or drums containing the curable silicone composition for hot dispensing. On the other hand, if the temperature at which the mixture is heated is less than the lower limit described above, the mixture will not be sufficiently softened, and it may be difficult to obtain a melted or softened mixture in which each component is uniformly mixed throughout, even by using mechanical force. If a mixture in which the components are not uniformly mixed is filled into the container in process P2, a uniformly mixed curable silicone composition cannot be obtained, and problems such as inferior curing, inferior melting, or the like may occur during use. Conversely, if the temperature at which the mixture is heated exceeds the aforementioned upper limit, a hydrosilylation reaction may occur during mixing as an unintended side reaction or the like of the photoactive hydrosilylation reaction catalyst or the thermoplastic resin microparticles containing a platinum-based catalyst, which are component (D), and thus the entire mixture can be significantly thickened or cured to lose hot-melt properties, or a cured product will be formed, neither of which is preferable. Furthermore, in order to suppress unintended side reactions, a method may be and is preferably used where component (D) which is a photoactive hydrosilylation reaction catalyst or thermoplastic resin microparticles containing a hydrosilylation reaction catalyst is not mixed with the other components from the beginning in process P1, but rather component (D) is added after sufficiently mixing the mixture of other components, and the heating temperature is lowered to a range where kneading is possible when adding component (D), or the like.

As described above, the kneading device used in process P1 is not limited and can be selected based on the work efficiency in terms of processing time and the ability to control shear heating. In particular, a continuous heating and kneading device such as single-screw extruders, twin-screw extruders, and the like equipped with heating and cooling functions are preferably used because of the short processing time and favorable work efficiency.

Process P2

Process P2 is a process of filling the containers for dispensing with the mixture after heating and melting obtained in process P1. If a continuous kneading device is used in process P1, excellent production efficiency can be achieved because the filling can be continuously performed. In this case, a nozzle that matches the inner diameter of the cartridge to be filled is attached to the outlet of a continuous kneading device, and by inserting the nozzle into the cartridge, the cartridge can be automatically filled by the pressure of dispensing the uniformly mixed composition from the nozzle. When the cartridge is completely filled, the cartridge is removed from the nozzle and the nozzle is continuously inserted into the next cartridge, allowing the filling process to be performed consecutively to match the speed of dispensing the composition.

Process P2 may be performed manually or may be automated. With the continuous method described above, the filling rate in process P2 of the mixture obtained in process P1 can be designed based on the scale of manufacture. As an example, the mixture obtained in process P1 can be continuously filled into the cartridges at a feed rate of 1 to 10 kg/hour, but needless to say, the filling condition is not limited accordingly. On the other hand, filling may be performed by continuously receiving the composition from the kneading machine directly into a pail or drum.

Dispensing Cartridge and Use Thereof

The curable silicone composition according to the present invention can be filled into dispensing cartridges in the aforementioned process P2, or the like, and can be suitably used for hot dispensing. Heat resistant cartridges for dispensing can be and are preferably used in process P2. The filling and dispensing processes are performed at approximately 100° C., so plastic cartridges with a heat resistance of approximately 120° C. can be used. Furthermore, a metal cartridge made of aluminum, for example, may also be used. On the other hand, if a cartridge that does not have heat resistance is used, problems such as deformation of the cartridges or the like may occur when used at a high temperature of 100° C. or higher, either during filling or during heat dispensing as described below. Similarly, the pails and drums are preferably made of metal, and preferably a type that can be used in the hot melter described later is selected.

The dispensing cartridge filled with curable silicone composition can be used by a dispenser equipped with a heating part (for example, a temperature control unit) that is commonly distributed. As described above, the curable silicone composition of the present invention has melting properties at 50° C. Therefore, if the cartridge is heated to 50° C. or higher, suitably 50 to 150° C., and preferably 80 to 120° C. by a temperature control unit, the composition can be smoothly dispensed at a dispensing pressure of approximately 0.5 MPa, for example, and thus can be used for hot dispensing. On the other hand, in the case of pails and drums, for example, a Nordson hot melter can be used to extrude the composition under high temperature and dispense the composition through a heat resistant hose.

Other Forms of Compositions and Variations of Manufacturing Methods

The curable silicone composition according to the present invention is suitably in the form of being filled into a dispensing cartridge, pail, or drum, but may also be in the form of a molded product such as a tablet, pellet, sheet, or film, as required. The molded product, particularly a sheet or film made of the curable silicone composition can be used in a form where at least one surface of an uncured curable silicone composition sheet or film is adhered to a portion or all of a substrate serving as an electronic component or a precursor thereof, by one or more means selected from vacuum laminator, vacuum press, and compression molding, and then irradiating with a high energy beam in order to cure the composition.

Furthermore, the curable silicone composition according to the present invention may be manufactured using the organopolysiloxane resin microparticles of component (A) as a raw material in process P1 or the like (method A), or may be manufactured by dispersing organopolysiloxane resin in solid form at room temperature along with, optionally, a chain diorganopolysiloxane dispersed in an organic solvent, and removing the organic solvent, such that the resulting solid with hot-melt properties may be used as raw material (hot-melt bulk method) (method B).

Specifically, the former manufacturing method (method A) includes the following processes:

- process PA1: a process of mixing organopolysiloxane resin microparticles and other raw materials (in some cases a functional filler may be included):
- process PA2: a process of kneading the mixture obtained in process PA1 while heating and melting at a temperature of 120° C. or lower.

Similarly, the latter manufacturing method (method B) includes the following processes:

- process PB1: a process of obtaining a hot-melt solid by removing an organic solvent at a temperature of 150° C. or higher from a solution in which (A) an organopolysiloxane resin in a solid state at room temperature and (B) a chain diorganopolysiloxane or the like are dispersed or dissolved in an organic solvent; and process PB2: a process where after adding the curing agent components (C+D) to the hot-meltable solids obtained in process PB1, the mixture is kneaded while heating and melting at a temperature 120° C. or lower.

The curable silicone composition obtained in the above processes may be molded into a sheet, tablet, or the like, for example, by dispensing between release films, or the heated and melted mixture obtained in process PA2 or process PB2 may be dispensed through a nozzle and continuously filled into the aforementioned containers (process P2, above) to fill the dispensing container.

Curing of Curable Silicone Composition and Manufacture of Laminate Body

When a photoactive hydrosilylation reaction catalyst is used as component (D), the curable silicone composition of the present invention can be thermally cured by using irradiation of a high energy beam as a trigger, but there are several curing methods depending on the combination of the dispensing process and the high energy beam irradiation process. Although the composition is heated to approximately 50 to 150° C. in the dispensing process, irradiating the composition with a high energy beam while dispensing or immediately after applying to the substrate allows thermal curing to occur before the composition cools down, thus allowing thermal curing to proceed to some extent before natural cooling on the substrate. The curing rate of the composition can be precisely controlled by the amount of catalyst and curing retarder added, as well as by the irradiation dose of the high energy beam. This can be suitably used when the composition is to be cured in an as-dispensed form, and is specifically applicable to sealing and encapsulating substrates. Curing progresses to some extent immediately after the composition is dispensed and adhesion to the substrate occurs; therefore, so-called immediate curing and shape fixating of the material can be achieved. If necessary, the resulting laminate body can be post-cured by exposure to a temperature of 10° C. or higher to form a fully cured product.

On the other hand, after dispensing the composition of the present invention onto the substrate with a dispenser, the composition may be irradiated with a high energy beam after a period of time. Even in this case, the composition of the present invention has shape retention at 25° C.; therefore, the dispensed material does not change shape due to dripping or the like. Furthermore, the shape of the composition can be changed to form an adhesive layer that joins two substrates together by adhering (preferably by pressing, for example, by applying an external force) a second substrate to the substrate on which the dispensed composition is placed. If neither of the two substrates is a light-impermeable material, it is necessary to irradiate with a high energy beam before pressure bonding the substrate to the second substrate. On the other hand, if one of the two substrates is a light transmitting substrate such as glass, the two substrates can be laminated together before irradiating with the high energy beam.

If a laminate body having a structure in which at least a portion or all of the surface of the two substrates are bonded via the cured product made of the composition of the present invention is manufactured by this method of use, the manufacturing method particularly preferably includes the following processes:

process (I): heating a curable silicone composition according to the present invention to 50° C. or higher by a dispenser equipped with a heating part to make the composition flowable, and dispensing the composition onto a portion or all of the surface of at least one substrate;

process (II): irradiating the curable silicone composition dispensed from the dispenser with a high energy beam directly or through another substrate, either at the same time as process (I) or after process (I); and, if necessary, process (III): after process (I), but before or after process (II), adhering the curable silicone composition dispensed from the dispenser to another substrate.

Herein, in process (I), precision coating is also possible by connecting a heatable slot die to the outlet of the dispenser to dispense the product in a film or sheet form with a desired thickness, and applying the product as is in the form of the substrate. Note that the curing reaction of the curable silicone composition according to the present invention after irradiation with a high energy beam proceeds over time at room temperature or with heating, to form the cured product, and therefore may be left at room temperature (around 25° C.) or exposed to a heat of 10° C. or higher, preferably 50° C. or higher, and more preferably 100° C. or higher, to cure the composition.

The substrate used with the above methods of use and in the laminate body is a member for electronic components, semiconductor devices or optical semiconductor devices, and the substrate with cured product containing the curable silicone composition according to the present invention (including laminate bodies having a structure in which at least two of the above substrate surfaces are bonded via the cured products) is an electronic component, semiconductor device, or optical semiconductor device, or is useful as a member thereof.

In the curable silicone composition of the present invention, if (D1) a photoactive hydrosilylation reaction catalyst is used as component (D), the catalyst can be activated by irradiation with a high energy beam such as UV rays or the like, and thus the hydrosilylation reaction in the composition proceeds, forming a cured product. The types of high energy beams are as described above. The irradiation dose depends on the type of the high energy beam activated catalyst, but in the case of UV rays, the integrated irradiation dose at 365 nm is preferably within a range of 100 mJ/cm$^2$ to 100 J/cm$^2$, may be within a range of 500 mJ/cm$^2$ to 50 J/cm$^2$, and may be within a range of 500 mJ/cm$^2$ to 20 J/cm$^2$. In other words, the curing reactive silicone composition of the present invention can initiate a curing reaction triggered by irradiation with a high energy beam such as UV rays or the like. Furthermore, the curing reaction rate can be controlled to some extent by changing the integrated irradiation dose. Note that once the hydrosilylation catalyst, which is component (D1), is activated, the curing reaction proceeds over time at room temperature or by heating to form a cured product even after irradiation with a high energy beam is stopped.

The curing reaction can be performed at a low temperature region (15 to 100° C.), including room temperature (25° C.). Note that in an embodiment of the present invention, “low temperature” refers, for example, to 100° C. or lower, specifically, a temperature range of 15° C. to 100° C., and even temperatures of 80° C. or lower can be selected. When the reaction of the composition (including a semi-cured product) of the present invention proceeds in the temperature range of 15 to 100° C., the present composition may suitably be left at or near room temperature range (a temperature range that can be reached without heating or cooling, particularly including a temperature region of 20 to 25° C.), may be cooled to 15° C. to room temperature, or may be heated to room temperature or higher and 100° C. or lower. Note that the time required for the curing reaction can be designed as appropriate based on the irradiation dose of a high energy beam such as UV rays or the like and the temperature. Furthermore, heating above 100° C. may be temporarily performed if tolerable and necessary for the process.

Furthermore, when (D2) thermoplastic resin microparticles containing a platinum-based catalyst are used as component (D) of the curable silicone composition of the present invention, the catalyst is activated by exposure to a temperature at or above the melting point or glass transition temperature of the thermoplastic resin, for example, a high temperature of 130° C. or higher, rather than by irradiation with a high energy beam, and the condition remains as described above, except that the hydrosilylation reaction is initiated.

If component (D2) is used, a molding process is a characteristic method of use other than the method of use of the photoactive catalyst-containing composition that is the aforementioned component (D1). It is well known that transfer molding and compression molding are used to form liquid thermosetting compositions, but the composition for hot dispensing of the present invention can also be applied to this molding process, so long as there is a heating unit. These molding processes dispense the liquid composition directly into the molding machine, which is an unsuitable process for applying compositions that cannot be cured without irradiation with a high energy beam, but the curable silicone composition containing component (D2) has an advantage that the hydrosilylation reaction catalyst is activated by high temperature exposure, and thus is suitable for use in these molding processes.

Note that the curing reaction by exposure to high temperature and adhesion to the adherend proceed simultaneously due to the properties of component (D2); therefore, when manufacturing a laminate body having a structure in which at least two substrate surfaces are partially or completely bonded through a cured product containing the composition of the present invention, and when component (D) of the curable silicone composition is (D2) thermoplastic resin microparticles containing a platinum-based catalyst, the manufacturing method preferably includes the following processes (I) to (III).

Process (I): heating a curable silicone composition to 50° C. or higher by a dispenser equipped with a heating part to make the composition flowable, and dispensing the composition onto a portion or all of the surface of at least one substrate;

if necessary, process (II): after process (I), adhering the curable silicone composition dispensed from the dispenser to another substrate; and Process (III): heating the resulting integrated substrate and curable silicone composition to a temperature of 130° C. or higher.

Hardness of Cured Product and Compatible Use Form

A preferred hardness of the cured product obtained by curing the curable silicone composition of the present invention can be classified into two categories depending on an application thereof. When adherends are adhered to both surfaces of the curable silicone composition of the present invention (in other words, with use as an adhesive), the Type A durometer hardness specified in "Durometer Hardness Test Method for Plastics" of JIS K 7215-1986 is preferably 30 or higher. This is because if the hardness is at or below the lower limit described above, the cured product tends to be too soft and brittle. On the other hand, if the application thereof is substrate sealing or encapsulation (in other words a sealing agent-like use), the Type A durometer hardness is preferably 40 or higher. This is because if the hardness is at or below the lower limit described above, the surface of the cured product becomes sticky, and thus handling performance is reduced.

Applications of Composition/Cured Product

The curable silicone compositions described above can be used as a sealant or sealing agent by dispensing the cured product to a substrate surface using a hot dispenser at a temperature of 50° C. or higher, and curing by the method described above, because the cured products have relatively low tack and have a low surface stickiness. Furthermore, it is also possible to use the composition as a bonding layer or adhesive layer between different substrates (members) by adhering another substrate (suitably, by applying external force to press the substrate against the composition layer to deform the composition layer can cause adhesion) before the dispensed composition cools, and then curing the composition by the method described above. In other words, the curable silicone composition according to the present invention is suitable as a hot-melt adhesive or hot-melt sealing agent with curing properties that are triggered by high energy beam irradiation or high temperature. In particular, uncured or semi-cured composition layers made of the curable silicone composition according to the present invention and cured products made by curing the composition are useful as members of electronic components, semiconductor devices or optical semiconductor devices.

Specifically, the curable silicone composition according to the present invention has the aforementioned hot-melt properties, excellent handling workability and curability while melted (hot-melted), and excellent coloring resistance of the resulting cured product obtained by curing the present composition at high temperature. Therefore, the composition is useful for sealing materials for semiconductor members such as light emitting and optical devices, optical reflective materials and the like, as well as optical semiconductors containing the cured product. Furthermore, the cured product has excellent mechanical properties and is relatively hard with low tackiness. Therefore, the cured product is suitable as: a sealing agent for semiconductors; a sealing agent for power semiconductors such as SiC, GaN, or the like; or as an adhesive, potting agent, protective agent, coating agent, or sealant for electrical and electronic applications. The composition is particularly suitable for use as a sealant that is required to retain shape after dispensing, or as a sealing agent for semiconductors that requires a thick layer. This composition (uncured or semi-cured composition layer) is adhered to a substrate and suitably crushed by an external force between two substrates to form a film that can be used as an adhesive layer or a stress buffer layer between two substrates with different coefficients of linear expansion. Note that the curable silicone composition of the present invention may be a sealing agent for single-sided sealing or for double-sided sealing along with adhesion between two substrates, and has preferred properties suitable for these applications.

Note that the curable silicone composition of the present invention can be flexibly adapted to desired applications and curing processes by selecting and optimizing component (D), and thus can be applied to electronic components, semiconductor devices or optical semiconductor device members or precursors thereof to meet a wide range of functional and process requirements.

The cured product obtained by curing the curable silicone composition of the present invention has no particular limitations on applications, but can be suitably used as a component for electronic components, semiconductor devices, and optical semiconductor devices, and can be suitably used as a sealing material for semiconductor elements and IC chips and the like, or as an adhesive, bonding member or sealant for semiconductor devices, and is particularly suitable for applications requiring high heat resistance and light resistance.

The semiconductor device provided with a member containing the cured product obtained by curing the curable silicone composition of the present invention is not particularly limited, but is preferably a light emitting semiconductor device, which is a light emitting/optical device, optical members for displays, members for solar panels, and in particular, sealing materials, casing materials, or adhesive members for these devices or the like. Furthermore, the cured product of the present invention has excellent coloring resistance at high temperatures, and therefore is more preferably used as a sealing material, casing material, or adhesive member used in electronic materials where transparency and light/heat resistance are important.

As described above, the curable silicone composition of the present invention may be in the form of a tablet, pellet, sheet or film molded product, and may be used by curing or molding, arranged as components for electronic components, semiconductor devices or optical semiconductor device members in forms other than hot dispensing.

EXAMPLES

The curable silicone composition of the present invention and manufacturing method thereof are described below in detail using examples and comparative examples. Note that in the following description, Me, Vi, and Ph in the average unit formula represent methyl, vinyl, and phenyl groups, respectively. Furthermore, the melt viscosity, dispensability, stability of the composition during dispensing, and hardness of the cured product were measured for the curable silicone compositions of each example and comparative example by the following methods. The results are shown in Table 2.

Melt Viscosity at 100° C.

The melt viscosity of the curable silicone composition at 100° C. was measured using a Koka-type flow tester CFT-500EX (manufactured by Shimadzu Corporation) using a nozzle with a 1.0 mm outlet nozzle diameter at 2.5 MPa pressure.

Hot Dispensing Properties (Initial)

A cartridge filled with the curable silicone composition was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C. to warm the cartridge. After the cartridge was sufficiently warmed, a test was conducted to determine whether the composition could be smoothly dispensed by dispensing on a glass plate using a digital dispenser (ML-606GX manufactured by Musashi Engineering Co., Ltd.) at a pressure of 0.5 MPa.

Hot Dispensing Properties (after 5 Hours at 100° C.)/Stability of the Composition During Dispensing A cartridge filled with the curable silicone composition was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C., and maintained for 5 hours. Next, a test was conducted to determine whether the composition could be smoothly dispensed by dispensing on a glass plate using a digital dispenser (ML-606GX manufactured by Musashi Engineering Co., Ltd.) at a pressure of 0.5 MPa.

Hardness of Cured Product

The curable silicone composition was cured under prescribed curing conditions to form a cured product. The hardness of the cured product was measured by a type A durometer specified in JIS K 7215-1986 "Durometer Hardness Testing Method for Plastics."

Reference Examples 1-7: Preparation of Hot-Melt Siloxane Mixture

In each reference example, the following organopolysiloxane resins (a1), (a2), (a') and linear organopolysiloxanes (b), (b') {hereinafter referred to as components (a1), (a2), (a'), (b), (b')} were mixed to prepare siloxane mixtures with hot-melt properties (hereinafter referred to as mixtures 1 to 7). Note that the low molecular weight organopolysiloxane components removed by the methods described in the reference examples include a $M_4Q$ structure and the like.

Component (a1): an organopolysiloxane resin (amount of vinyl groups=1.9 mass %) that is a white solid at 25° C., expressed by the average unit formula:

$$(Me_2ViSiO_{1/2})_{0.05}(Me_3SiO_{1/2})_{0.39}(SiO_{4/2})_{0.56}(HO_{1/2})_{0.02}$$

Component (a2): an organopolysiloxane resin (amount of vinyl groups=0 mass %) that is a white solid at 25° C. expressed by the average unit formula:

$$(Me_3SiO_{1/2})_{0.44}(SiO_{4/2})_{0.56}(HO_{1/2})_{0.02}$$

Component (a'): an organopolysiloxane resin in a white solid state at 25° C., expressed by the average unit formula:

$$(Me_3SiO_{1/2})_{0.44}(SiO_{4/2})_{0.56}(HO_{1/2})_{0.02}.$$

Component (b): dimethylpolysiloxane (amount of vinyl groups=0.09 mass %) capped at both molecular chain ends with dimethylvinylsiloxy groups, expressed by formula $ViMe_2SiO(Me_2SiO)_{800}SiViMe_2$ Component (b'): dimethylpolysiloxane capped at both molecular chain ends with trialkoxysiloxy groups, expressed by formula: $(OMe)_3SiO(Me_2SiO)_{800}Si(OMe)_3$ In each reference example, components (a1), (a2), (a'), (b), and (b') in the amounts (kg) shown in Table 1 below were dissolved in 4.00 kg of xylene in a pail can using a three-one motor. The resulting solution was fed into a twin-screw extruder with the maximum attainable temperature set at 230° C. The xylene and low molecular weight organopolysiloxane components were removed under a vacuum degree of −0.08 MPa, resulting in transparent hot-melt mixtures 1 to 7. The mixtures 1 to 7 were placed in a cylindrical pail can and cooled to a solid state. The results of measuring the amount of volatile components of each mixture at 200° C. for 1 hour are shown in Table 1 as "Amount of volatile components (mass %)".

TABLE 1

| Component (kg) | Reference Example No. 1 | 2 | 3 | 4 | 5 | 6 | 7 |
|---|---|---|---|---|---|---|---|
| (a1) | 2.10 | 2.26 | 2.35 | 3.04 | 3.76 | 2.54 | |
| (a2) | 3.92 | 4.21 | 3.17 | 2.49 | 3.08 | 2.83 | |
| (a') | | | | | | | 5.29 |
| (b) | 3.52 | 3.05 | 3.99 | 3.88 | 2.56 | 4.33 | |
| (b') | | | | | | | 4.45 |
| Amount of volatile components (mass %) | 0.7 | 0.7 | 0.7 | 0.7 | 0.7 | 0.7 | 0.7 |

Examples 1 to 4, Comparative Examples 1 to 4

In the following examples and comparative examples, the following compounds were used in addition to mixtures 1 to 7 and component (b). A twin-screw extruder of the form depicted in FIG. 1 was used in preparing the compositions for each example. Furthermore, the properties of each of the obtained curable silicone compositions are shown in Table 2.

Component (c1): an organohydrogen polysiloxane expressed by $$(PhSiO_{3/2})_{0.4}(HMe_2SiO_{1/2})_{0.6}$$

(amount of volatile components during aging in oven at 100° C. under atmospheric pressure for one hour, in other words, mass loss ratio, of 3.4 mass %)

Component (c2): an organohydrogen polysiloxane expressed by $$(HMe_2SiO_{1/2})_{0.52}(Me_2SiO_{2/2})_{0.15}(SiO_{4/2})_{0.33}$$

(amount of volatile components during aging in oven at 100° C. under atmospheric pressure for one hour, in other words, mass loss ratio, of 2.9 mass %)

Component (c'): an organohydrogen polysiloxane expressed by $$Me_3SiO(Me_2SiO)_{37}(MeHSiO)_{37}SiMe_3$$

(amount of volatile components during aging in oven at 100° C. under atmospheric pressure for one hour, in other words, mass loss ratio, of 2.6 mass %)

Component (c"): an organopolysiloxane containing a 3-mercaptopropyl group expressed by formula: $Me_3SiO(Me_2SiO)_{29}[Me(HSC_3H_6)SiO]_3SiMe_3$ Component (d1): (Methylcyclopentadienyl) trimethyl platinum (IV) complex Component (d2): Polycarbonate resin particles containing 4000 ppm of platinum as a 1,3-divinyl-1,1,3,3-tetramethyldisiloxane complex of platinum Component (d"): a 1,3-divinyltetramethyldisiloxane solution of a 1,3-divinyl-1,1,3,3-tetramethyldisiloxane complex of platinum Component (e): Methyltris-1,1-dimethyl-2-propynyloxysilane (boiling point=245° C. (1013.25 hPa))

Component (f): Carbon black (product name: DENKA BLACK 100% Press, manufactured by DENKA Corporation)

Component (f'): Titanium oxide (SX-3103, manufactured by Sakai Chemical Industry Co.)

Example 1

Mixture 1 was fed into a twin-screw extruder ("2" in FIG. 1) at 170° C. using a hot melter (VersaPail Metter manufactured by Nordson "1" in FIG. 1) for cylindrical pails at 9.54 kg/hr. Next, a mixture containing component (c1) at a rate of 0.31 kg/hr and component (e) at 500 ppm with regard to the total of the composition was fed using pump 3-*a* depicted in FIG. 1. The set temperature of the feeding part was 150° C.

Next, a mixture containing component (b) 0.15 kg/hr and component (d1) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Example 2

Mixture 2 was fed into a twin-screw extruder ("2" in FIG. 1) at 170° C. using a hot melter (VersaPail Melter manufactured by Nordson "1" in FIG. 1) for cylindrical pails at 9.52 kg/hr. Next, a mixture containing component (c2) at a rate of 0.33 kg/hr and component (e) at 500 ppm with regard to the total of the composition was fed using pump 3-*a* depicted in FIG. 1. The set temperature of the feeding part was 150° C.

Next, a mixture containing component (b) 0.15 kg/hr and component (d1) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Example 3

Mixture 3 was fed into a twin-screw extruder ("2" in FIG. 1) at 170° C. using a hot melter (VersaPail Metter manufactured by Nordson "1" in FIG. 1) for cylindrical pails at 9.51 kg/hr. Next, a mixture containing component (c1) at a rate of 0.34 kg/hr and component (e) at 500 ppm with regard to the total of the composition was fed using pump 3-*a* depicted in FIG. 1. The set temperature of the feeding part was 150° C.

Next, a mixture containing component (b) at 0.15 kg/hr and component (d1) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Example 4

Mixture 4 was fed into a twin-screw extruder ("2" in FIG. 1) at 170° C. using a hot melter (VersaPail Melter manufactured by Nordson "1" in FIG. 1) for cylindrical pails at 9.41 kg/hr. Next, a mixture containing component (c2) at a rate of 0.440 kg/hr and component (e) at 500 ppm with regard to the total of the composition was fed using pump 3-*a* depicted in FIG. 1. The set temperature of the feeding part was 150° C.

Next, a mixture containing component (b) at 0.15 kg/hr and component (d1) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Example 5

Mixture 3 was fed into a twin-screw extruder ("2" in FIG. 1) at 170° C. using a hot melter (VersaPail Melter manufactured by Nordson "1" in FIG. 1) for cylindrical pails at 9.41 kg/hr. Next, a mixture containing component (c1) at a rate of 0.34 kg/hr, component (e) at 500 ppm with regard to the total of the composition, and component (f) at 0.1 kg/hr was fed using pump 3-*a* depicted in FIG. 1. The set temperature of the feeding part was 150° C. Next, a mixture containing component (b) at 0.15 kg/hr, component (d2) (an amount that provides 10 ppm by mass of platinum metal based on the entire composition), and component (f) at 0.1 kg/hr was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Example 6

Mixture 4 was fed into a twin-screw extruder ("2" in FIG. 1) at 170° C. using a hot melter (VersaPail Metter manufactured by Nordson "1" in FIG. 1) for cylindrical pails at 8.47 kg/hr. Next, a mixture containing component (b) at 0.085 kg/hr, component (c2) at 0.396 kg/hr, component (e) at 500 ppm with regard to the total composition, and component (f') at 1.0 kg/hr was fed using pump 3-*a* depicted in FIG. 1. The set temperature of the feeding part was 150° C.

Next, a mixture containing component (b) at 0.05 kg/hr and component (d2) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Comparative Example 1

Mixture 5 was fed into a twin-screw extruder ("2" in FIG. 1) at 170° C. using a hot melter (VersaPail Melter manufactured by Nordson "1" in FIG. 1) for cylindrical pails at 9.40 kg/hr. Next, a mixture containing component (c') at a rate of 0.450 kg/hr and component (e) at 500 ppm with regard to the total of the composition was fed using pump 3-*a* depicted in FIG. 1. The set temperature of the feeding part was 150° C.

Next, a mixture containing component (b) at 0.15 kg/hr and component (d) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Comparative Example 2

Mixture 1 was fed into a twin-screw extruder ("2" in FIG. 1) at 170° C. using a hot melter (VersaPail Metter manufactured by Nordson "1" in FIG. 1) for cylindrical pails at 9.54 kg/hr. Next, a mixture containing component (c1) at a rate of 0.310 kg/hr and component (e) at 3500 ppm with regard to the total of the composition was fed using pump 3-*a* depicted in FIG. 1. The set temperature of the feeding part was 150° C.

Next, a mixture containing component (b) at 0.15 kg/hr and component (d'') (an amount that provides 4 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Comparative Example 3

Mixture 6 was fed into a twin-screw extruder ("2" in FIG. 1) at 170° C. using a hot melter (VersaPail Melter manufactured by Nordson "1" in FIG. 1) for cylindrical pails at 9.70 kg/hr. Next, a mixture containing component (c") at 0.150 kg/hr and 2-hydroxy-2-methylpropiophenone (an amount of 1000 ppm by mass for the entire composition) was fed from pump 3-*a* depicted in FIG. 1. The set temperature of the feeding part was 150° C.

Next, a mixture containing component (b) at 0.15 kg/hr and 2,6-tert-butyl-4-methylphenol (an amount that provides 100 ppm by mass of the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

Comparative Example 4

Mixture 7 was fed into a twin-screw extruder ("2" in FIG. 1) at 170° C. using a hot melter (VersaPail Metter manufactured by Nordson "1" in FIG. 1) for cylindrical pails at 9.74 kg/hr. Next, a mixture containing the dimethylpolysiloxane capped at both ends of the molecular chain with trimethoxysiloxy groups expressed by $$(OMe)_3SiO(Me_2SiO)_{800}Si(OMe)_3$$

at 0.15 kg/hr, isobutyltrimethoxysilane at 0.110 kg/hr, and tetra-tertiary butyl titanium (an amount of 800 ppm by mass as titanium metal in the entire composition) was fed by the pump 3-*b* in FIG. 1 (set temperature of feeding part was 80° C.), and degassing melt-kneading was performed with the degree of vacuum in an extruder of −0.08 MPa. The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat resistant cartridge (Unity HiTemp syringe, manufactured by Nordson) with a capacity of 30 mL.

TABLE 2

| | | Example 1 | Example 2 | Example 3 | Example 4 | Example 5 | Example 6 |
|---|---|---|---|---|---|---|---|
| Melt viscosity at 100° C. [° C.] | | 10 | 20 | 6 | 6 | 6 | 7 |
| Hot dispensing properties | Initial | ○ | ○ | ◎ | ◎ | ◎ | ◎ |
| | After sitting at 100° C. for 5 hours | ○ | ○ | ◎ | ◎ | ◎ | ◎ |
| Curing conditions | Light irradiation (*) | Present | Present | Present | Present | None | None |
| | Temperature | 100° C. | 100° C. | 100° C. | 100° C. | 150° C. | 150° C. |
| | Time | 1 hour | 1 hour | 1 hour | 1 hour | 1 hour | 1 hour |
| Hardness (Shore A) | | 58 | 52 | 47 | 64 | 45 | 63 |

| | | Comparative Example 1 | Comparative Example 2 | Comparative Example 3 | Comparative Example 4 |
|---|---|---|---|---|---|
| Melt viscosity at 100° C. [° C.] | | 90 | 10 | 7 | 5 |
| Hot dispensing properties | Initial | X | ○ | ◎ | ◎ |
| | After sitting at 100° C. for 5 hours | X | X | ◎ | ◎ |
| Curing conditions | Light irradiation (*) | Present | None | Present | None |
| | Temperature | 100° C. | 150° C. | 25° C. | 25° C. |
| | Time | 1 hour | 1 hour | 10 minutes | 150 hours |
| Hardness (Shore A) | | N/A | 85 | 32 | 45 |

(*) UV rays with a wavelength of 365 nm were irradiated with an irradiation dose of 10 J/cm$^2$.

SUMMARY

The curable silicone compositions of Examples 1 to 6 according to the present invention used a specific solid organopolysiloxane resin and chain organopolysiloxane, together with a photoactive hydrosilylation reaction catalyst (Examples 1 to 4) or polycarbonate resin microparticles containing a hydrosilylation catalyst (Examples 5, 6). By controlling the melt viscosity properties, favorable curability was achieved by using UV irradiation or exposure to high temperatures to trigger curing without compromising storage stability during dispensing, while providing excellent hot dispensing properties. Furthermore, the resulting silicone cured product has low surface tack and is relatively hard, and therefore is expected to be suitably used for applications in protecting semiconductor elements and the like.

On the other hand, Comparative Example 1 is a curable silicone composition using a photoactive hydrosilylation catalyst, but the melt viscosity was too high to dispense at a temperature of approximately 100° C. Although the curable silicone composition in Comparative Example 2 can provide excellent dispensability, ensuring storage stability during dispensing was extremely difficult because of the use of an ordinary hydrosilylation catalyst. On the other hand, Comparative Examples 3 and 4 were curable silicone compositions using a different curing system, but the UV-curing Comparative Example 3 had difficulty forming a hard cured product, and the room temperature moisture-curing Comparative Example 4 required a long time for curing.

Reference Examples 1 to 4

The curable silicone compositions of Examples 5 and 6 contain (f) carbon black as a black pigment or (f') titanium oxide as a white pigment to provide black and white cured products, respectively. The following dispensing and molding methods can be used because the compositions contain a (d2) catalyst that has the property of being activated as a hydrosilylation reaction catalyst upon exposure to high temperature.

Reference Example 1 (Hot Dispensing Method)

A cartridge filled with the curable silicone composition obtained in Example 6 was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C. to warm the cartridge. After the cartridge was sufficiently warmed and the composition was dispensed on a glass plate using a digital dispenser (ML-606GX manufactured by Musashi Engineering Co., Ltd.) at a pressure of 0.5 MPa, the shape was maintained as dispensed, without dripping. The laminate body obtained was exposed, as is, to 160° C. for 1 hour to obtain a cured product. The resulting cured product was strongly adhered to the glass substrate.

Reference Example 2 (Hot Dispensing Method)

The curable silicone composition (Example 6) was dispensed from the digital dispenser onto a glass plate similar to Reference Example 1, and a second glass plate was overlaid and manually pressed to spread the composition. The resulting laminate body was exposed as is to 160° C. for 1 hour to obtain a cured product. The resulting cured product was strongly adhered to the two glass substrates.

Reference Example 3 (Transfer Molding Method)

A cartridge filled with the curable silicone composition obtained in Example 5 was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C. to warm the cartridge. After the cartridge was sufficiently warmed, the composition was applied to a transfer molding machine by a digital dispenser (ML-606GX manufactured by Musashi Engineering Co., Ltd.) at a pressure of 0.5 MPa, molding was performed on an aluminum substrate with a size of 10 cm×10 cm at a temperature of 160° C. for 10 minutes while a tetrafluoroethylene resin release film was held on the mold in order to obtain a clean molded body.

Reference Example 4 (Compression Molding Method)

Similar to Reference Example 3, the composition was applied from a digital dispenser to a compression molding machine, and molding was performed on a 10 cm×10 cm aluminum substrate at a temperature of 160° C. for 10 minutes while a tetrafluoroethylene resin release film was sandwiched against the mold, and a clean molded body was obtained.

Reference Example 5 (Hot Dispense+Slot Die Method)

A slot die with a heatable outlet gap of 100 μm was attached to the tip end of the digital dispenser of Reference Example 1, and the curable silicone composition obtained in Preparation Example 1 was dispensed and applied onto a glass plate at a die temperature setting of 100° C. The composition was irradiated with UV rays at a wavelength of 365 nm at an irradiation dose of 10 J/cm$^2$ and exposed to 100° C. for 1 hour to obtain a cured product. The cured product obtained was strongly adhered to the glass substrate, and the film thickness was 100 μm as applied.

DESCRIPTION OF THE REFERENCE NUMERALS

1: Hot melter
2: Extruder
3-*a*: Pump
3-*b*: Pump
3-*c*: Vacuum pump
4: Dispensing port (may optionally be fitted with a nozzle for cartridge filling)

The invention claimed is:

1. A curable silicone composition, comprising:

(A) 100 parts by mass of organopolysiloxane resin containing the following components (A1) and (A2) at a mass ratio of from 20:80 to 90:10, where each of components (A1) and (A2) does not have hot-melt properties and is solid at 25° C.,
  (A1) an organopolysiloxane resin having a curing reactive functional group with a carbon-carbon double bond included in a molecule, and containing siloxane units expressed by $SiO_{4/2}$ making up at least 20 mol % or more of all siloxane units, and
  (A2) an organopolysiloxane resin not having a curing reactive functional group with a carbon-carbon double bond included in a molecule, and containing a siloxane unit expressed by $SiO_{4/2}$ making up at least 20 mol % or more of all siloxane units;

(B) 10 to 100 parts by mass of a linear organopolysiloxane in a liquid state at 25° C., having a curing reactive functional group containing at least two carbon-carbon double bonds in a molecule;

(C) an organohydrogen polysiloxane having at least two silicon atom-bonded hydrogen atoms in a molecule, at an amount where the number of hydrogen atoms bonded to a silicon atom per one alkenyl group bonded to a silicon atom included in the entire composition is 0.5 to 20.0; and (D) a catalytic amount of a hydrosilylation reaction catalyst, which is inert at room temperature but activated in the composition after external energy stimulus;

wherein the composition as a whole has hot-melt properties, and the melt viscosity, measured using a flow tester: outlet nozzle diameter 1 mm, pressure 2.5 MPa, at 100° C. is 50 Pa·s or less; and wherein component (A) has a mass loss ratio of 2.0 mass % or less when exposed to 200° C. for one hour.

2. The curable silicone composition according to claim 1, further comprising:

(E) 1 to 5000 ppm of a hydrosilylation reaction curing retarder having a boiling point of 200° C. or higher at atmospheric pressure, based on the total mass of the composition.

3. The curable silicone composition according to claim 1, wherein component (D) contains one or more hydrosilylation reaction catalyst selected from:

(D1) a hydrosilylation reaction catalyst that exhibits activity in the composition due to irradiated high energy beam; and (D2) thermoplastic resin microparticles containing a hydrosilylation reaction catalyst.

4. The curable silicone composition according to claim 1, wherein component (A) has a mass loss ratio of 1.0 mass % or less when exposed to 200° C. for one hour.

5. The curable silicone composition according to claim 1, wherein:

component (A1) is (A1-1) an organopolysiloxane resin that does not have hot-melt properties alone, expressed by the following average unit formula:

$$(R^1_3SiO_{1/2})_a(R^1_2SiO_{2/2})_b(R^1SiO_{3/2})_c(SiO_{4/2})_d(R^2O_{1/2})_e$$

where each $R^1$ independently represents a monovalent hydrocarbon group with 1 to 10 carbon atoms, but 1 to 12 mol % of all $R^1$ in one molecule represents an alkenyl group; each $R^2$ represents a hydrogen atom or an alkyl group with 1 to 10 carbon atoms; and a, b, c, d, and e represent numbers that satisfy $0.10\leq a\leq 0.60$, $0\leq b\leq 0.70$, $0\leq c\leq 0.80$, $0.2\leq d\leq 0.65$, $0\leq e\leq 0.05$, but $(c+d)>0.20$ and $(a+b+c+d)=1$;

component (A2) is (A2-1) an organopolysiloxane resin that does not have hot-melt properties alone, expressed by the following average unit formula:

$$(R^3_3SiO_{1/2})_f(R^3_2SiO_{2/2})_g(R^3SiO_{3/2})_h(SiO_{4/2})_i(R^2O_{1/2})_j$$

where each $R^3$ independently represents a monovalent hydrocarbon group with 1 to 10 carbon atoms and that does not contain a carbon-carbon double bond; $R^2$ represents a hydrogen atom or an alkyl group with 1 to 10 carbon atoms; and f, g, h, i, and j represent numbers that satisfy $0.35\leq f\leq 0.55$, $0\leq g\leq 0.20$, $0\leq h\leq 0.20$, $0.45\leq i\leq 0.65$, $0\leq j\leq 0.05$, and $(f+g+h+i)=1$; and component (B) is (B1) a linear diorganopolysiloxane expressed by the following structural formula:

$$R^4_3SiO(SiR^4_2O)_kSiR^4_3$$

where each $R^4$ independently represents a monovalent hydrocarbon group with 1 to 10 carbon atoms, but at least two of the $R^4$s in one molecule represent an alkenyl group, and k represents a number from 20 to 5,000.

6. A hot-melt adhesive or hot-melt sealing agent, comprising the curable silicone composition according to claim 1.

7. A cartridge, comprising: the curable silicone composition according to claim 1, in the form of a dispensing cartridge, pail, or drum filled with the curable silicone composition.

8. A cured product, obtained by curing the curable silicone composition according to claim 1.

9. An electronic component, semiconductor device, or optical semiconductor device, comprising the cured product according to claim 8.

10. A laminate body, comprising: a substrate and an uncured location or layer containing the curable silicone composition according to claim 1 on a portion or all of the surface of the substrate.

11. A laminate body, comprising: two or more substrates; and having a structure in which at least a portion of respective surfaces of the two substrates are bonded via the cured product according to claim 8.

12. The laminate body according to claim 11, wherein the laminate body is one or more selected from electronic components, semiconductor devices, and optical semiconductor devices.

13. A method of manufacturing the laminate body according to claim 11, the method comprising:

process (I): heating the curable silicone composition to 50° C. or higher by a dispenser equipped with a heating part to make the curable silicone composition flowable, and dispensing the curable silicone composition onto a portion or all of the surface of at least one substrate;

process (II): irradiating the curable silicone composition dispensed from the dispenser with a high energy beam directly or through another substrate, either at the same time as process (I) or after process (I); and, process (III): after process (I), but before or after process (II), adhering the curable silicone composition dispensed from the dispenser to another substrate.

14. A method of manufacturing the laminate body according to claim 11, the method comprising:

process (I): heating the curable silicone composition to 50° C. or higher by a dispenser equipped with a heating part to make the curable silicone composition flowable, and dispensing the curable silicone composition onto a portion or all of the surface of at least one substrate;

process (II): after process (I), adhering the curable silicone composition dispensed from the dispenser to another substrate; and process (III): heating the resulting integrated substrate and curable silicone composition to a temperature of 130° C. or higher.

15. The method of manufacturing a laminate body according to claim 14, wherein in process (I), a heatable slot die is connected to an outlet of the dispenser, to dispense the curable silicone composition in the form of a film or sheet of desired thickness.

16. The method of manufacturing a laminate body according to claim 13, wherein in process (I), a heatable slot die is connected to an outlet of the dispenser, to dispense the curable silicone composition in the form of a film or sheet of desired thickness.

* * * * *